US012785789B2

(12) United States Patent
Van Phan et al.

(10) Patent No.: US 12,785,789 B2
(45) Date of Patent: Nov. 3, 2026

(54) RELAY EXTENSION IN CELLULAR NETWORK

(71) Applicant: Nokia Technologies Oy, Espoo (FI)

(72) Inventors: Vinh Van Phan, Oulu (FI); Ling Yu, Espoo (FI); Lianghai Ji, Aalborg (DK); Faranaz Sabouri-Sichani, Aalborg (DK); György Tamás Wolfner, Budapest (HU); Berthold Panzner, Munich (DE); Jakob Lindbjerg Buthler, Aalborg (DK); Rudraksh Shrivastava, Stuttgart (DE); Sudeep Hegde, Stuttgart (DE); Prajwal Keshavamurthy, Munich (DE)

(73) Assignee: Nokia Technologies Oy, Espoo (FI)

( * ) Notice: Subject to any disclaimer, the term of this patent is extended or adjusted under 35 U.S.C. 154(b) by 317 days.

(21) Appl. No.: 18/682,760

(22) PCT Filed: Aug. 11, 2021

(86) PCT No.: PCT/EP2021/072340
§ 371 (c)(1),
(2) Date: Feb. 9, 2024

(87) PCT Pub. No.: WO2023/016634
PCT Pub. Date: Feb. 16, 2023

(65) Prior Publication Data
US 2024/0364412 A1 Oct. 31, 2024

(51) Int. Cl.
*H04B 7/155* (2006.01)
*H04W 40/22* (2009.01)

(52) U.S. Cl.
CPC ........ *H04B 7/15507* (2013.01); *H04W 40/22* (2013.01)

(58) Field of Classification Search
CPC ... H04B 7/15507; H04W 40/22; H04W 88/04
See application file for complete search history.

(56) References Cited

U.S. PATENT DOCUMENTS

| | | | | |
|---|---|---|---|---|
| 2021/0144781 | A1 | 5/2021 | Xu et al. | |
| 2021/0250286 | A1* | 8/2021 | Norton | H04L 43/0858 |
| 2021/0274422 | A1* | 9/2021 | Norp | H04W 40/22 |
| 2024/0064593 | A1* | 2/2024 | Wu | H04W 36/362 |
| 2024/0196456 | A1* | 6/2024 | Kelif | H04W 76/14 |

OTHER PUBLICATIONS

"3rd Generation Partnership Project; Technical Specification Group Radio Access Network; Study on further enhancements to LTE Device to Device (D2D), User Equipment (UE) to network relays for Internet of Things (IoT) and wearables; (Release 15)", 3GPP TR 36.746, V15.1.1 , Apr. 2018, pp. 1-55.

(Continued)

*Primary Examiner* — Kevin C. Harper
*Assistant Examiner* — Salma Ayad
(74) *Attorney, Agent, or Firm* — Lippes Mathias LLP

(57) ABSTRACT

This document discloses a solution for performing rerouting of a relayed connection. In an aspect, a method for an anchor terminal device supporting relaying between an access node and an end terminal device comprises: receiving a message requesting rerouting of said relaying, the message comprising at least one information element indicating at least one candidate terminal device; determining a communication delay between the anchor terminal device and the end terminal device via at least one of said at least one candidate terminal device and comparing the determined communication delay with a maximum delay threshold; if at least one determined communication delay is smaller than the maximum delay threshold, rerouting the relaying between the anchor terminal device and the end terminal device via one of the at least one candidate terminal device that provides the communication delay smaller than the maximum delay threshold, wherein the rerouting is carried out autonomously without receiving from the access node a reconfiguration (Continued)

message instructing the rerouting configuration; and if no communication delay is smaller than the maximum delay threshold, causing transmission of a message to the access node, the message indicating a need for reconfiguration of the relaying.

14 Claims, 9 Drawing Sheets

(56) References Cited

OTHER PUBLICATIONS

"New SID: Study on NR sidelink relay", 3GPP TSG RAN Meeting #86, RP-193253, Agenda: 9.1.2, OPPO, Dec. 9-12, 2019, pp. 1-5.
"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.
"New SID: Study on NR sidelink relay", 3GPP TSG RAN Meeting #86, RP-193118, Agenda: 9.1.2, OPPO, Dec. 9-12, 2019, pp. 1-4.
International Search Report and Written Opinion received for corresponding Patent Cooperation Treaty Application No. PCT/EP2021/072340, dated Jun. 9, 2022, 13 pages.
"Motivations for eProSe R18", S2-2105449, OPPO, Aug. 10, 2021, 13 pages.
"3rd Generation Partnership Project; Technical Specification Group Services and System Aspects; Study on system enhancement for Proximity based Services (ProSe) in the 5G System (5GS) (Release 17)", 3GPP TR 23.752, V17.0.0, Mar. 2021, pp. 1-183.

* cited by examiner

RELAY EXTENSION IN CELLULAR NETWORK

RELATED APPLICATION

This application was originally filed as PCT Application No. PCT/EP2021/072340, filed on Aug. 11, 2021, of which is incorporated herein by reference in its entirety.

FIELD

Various embodiments described herein relate to the field of wireless communications and, particularly, to reconfiguring a relay extension in a cellular communication network.

BACKGROUND

The concept of relaying has been introduced into cellular networks. In a conventional relaying scenario, a connection between a terminal device and an access node of a cellular network is routed via at least one relay terminal device. Due to the mobility of the terminal devices, there may arise a need to reroute the relayed connection. Instead of changing the currently relaying relay terminal device, the relay terminal device may be maintained as an anchor terminal device, and the connection may be rerouted via a further terminal device. After the rerouting, the connection may then be relayed via multiple hops. However, setup of such a multi-hop relay extension should be performed efficiently.

BRIEF DESCRIPTION

Some aspects of the invention are defined by the independent claims.

Some embodiments of the invention are defined in the dependent claims.

The embodiments and features, if any, described in this specification that do not fall under the scope of the independent claims are to be interpreted as examples useful for understanding various embodiments of the invention. Some aspects of the disclosure are defined by the independent claims.

According to an aspect, there is provided an apparatus for an anchor terminal device supporting relaying between an access node and an end terminal device, comprising means for performing: receiving a message requesting rerouting of said relaying, the message comprising at least one information element indicating at least one candidate terminal device; determining a communication delay between the anchor terminal device and the end terminal device via at least one of said at least one candidate terminal device and comparing the determined communication delay with a maximum delay threshold; if at least one determined communication delay is smaller than the maximum delay threshold, rerouting the relaying between the anchor terminal device and the end terminal device via one of the at least one candidate terminal device that provides the communication delay smaller than the maximum delay threshold, wherein the rerouting is carried out autonomously without receiving from the access node a reconfiguration message instructing the rerouting configuration; and if no communication delay is smaller than the maximum delay threshold, causing transmission of a message to the access node, the message indicating a need for reconfiguration of the relaying.

In an embodiment, the means are further configured to receive, from the access node in response to the message indicating the need for the reconfiguration of the relaying, a new maximum delay threshold that is greater than the maximum delay threshold used in the comparison and greater than said at least one communication delay, and to perform said rerouting upon receiving the new maximum delay threshold.

In an embodiment, the means are configured to add one of the at least one determined communication delay to the message indicating the need for reconfiguration of the relaying.

In an embodiment, the means are configured to perform said rerouting by configuring a first radio link between the anchor terminal device and said one of the at least one candidate terminal device and a second radio link between the end terminal device and said one of the at least one candidate terminal device.

In an embodiment, the means are further configured to receive the at least one information element from the end terminal device, wherein the at least one information element indicating the at least one candidate terminal device comprises measurement data of at least one radio link between the end terminal device and the at least one candidate terminal device and/or measurement data of at least one radio link between the anchor terminal device and the at least one candidate terminal device, and to select said one of the at least one candidate terminal device on the basis of the measurement data.

In an embodiment, the measurement data comprises at least one of the following parameters:

- at least one of the following communication delays: at least one communication delay between the end terminal device and the at least one candidate terminal device, at least one communication delay between the end terminal device and the anchor terminal device via the at least one candidate terminal device, and at least one communication delay between the anchor terminal device and the at least one candidate terminal device;
- at least one of the following channel quality metrics: at least one channel quality metric of a radio channel between the end terminal device and the at least one candidate terminal device and at least one channel quality metric of a radio channel between the anchor terminal device and the at least one candidate terminal device.

In an embodiment, the means are configured to:

- determine, on the basis of the measurement data, whether or not to measure a radio link between the anchor terminal device and the at least one candidate terminal device,
- measure, upon determining to measure the radio link between the anchor terminal device and the at least one candidate terminal device, at least one of a communication delay and channel quality metric of the radio link between the anchor terminal device and the at least one candidate terminal device, and
- select said one of the at least one candidate terminal device on the basis of the measurement data and the measured at least one of the communication delay and channel quality metric of the radio link between the anchor terminal device and the at least one candidate terminal device.

According to an aspect, there is provided an apparatus for an end terminal device supporting relaying of a connection to an access node via an anchor terminal device, comprising means for performing: determining, in a situation where the connection is via the anchor terminal device, a need to reroute the relaying; performing a relay discovery procedure and detecting, on the basis of the relay discovery procedure, at least one candidate terminal device for the rerouting; determining, on the basis of the relay discovery procedure, measurement data of at least one of a radio link between the end terminal device and the at least one candidate terminal device and a radio link between the anchor terminal device and the at least one candidate terminal device; causing transmission of a message to the anchor terminal device, the message requesting rerouting of said relaying and comprising at least one information element indicating the at least one candidate terminal device, wherein the at least one information element indicating the at least one candidate terminal device comprises the measurement data; receiving a rerouting configuration message indicating one of the at least one candidate terminal device, and in response to the rerouting configuration message, establishing a relay route to the anchor terminal device via said one of the at least one candidate terminal device.

In an embodiment, the means are further configured to measure or receive, from the at least one candidate terminal device, at least one of the following parameters:

- at least one of the following communication delays: at least one communication delay between the end terminal device and the at least one candidate terminal device, at least one communication delay between the end terminal device and the anchor terminal device via the at least one candidate terminal device, and at least one communication delay between the anchor terminal device and the at least one candidate terminal device;
- at least one of the following channel quality metrics: at least one channel quality metric of a radio channel between the end terminal device and the at least one candidate terminal device and at least one channel quality metric of a radio channel between the anchor terminal device and the at least one candidate terminal device.

In an embodiment, the message transmitted to the anchor terminal device comprises at least one information element indicating whether the relay discovery procedure is based on:

- unidirectional discovery where the means are configured to receive at least one broadcast discovery message from the at least candidate terminal device; or
- bidirectional discovery where the means are configured to initiate the relay discovery procedure by transmitting a discovery request message and to receive a discovery response message from the at least one candidate terminal device.

According to an aspect, there is provided an apparatus for an access node supporting relaying of a connection to an end terminal device via an anchor terminal device, comprising means for performing: receiving, from the anchor terminal device in a situation where a communication delay between the anchor terminal device and the end terminal device via a further terminal device is smaller than a maximum delay threshold, a notification that the anchor terminal device has performed autonomous rerouting of the connection via the further terminal device and, in response to said receiving the notification, storing information on the rerouting; and receiving, from the anchor terminal device in a situation where the communication delay between the anchor terminal device and the end terminal device via the further terminal device is greater than the maximum delay threshold, a message indicating a need for reconfiguration of the relaying and, in response to said receiving the message, reconfiguring at least one parameter of the connection to enable said rerouting, wherein the at least one parameter reduces the communication delay between the end terminal device and the anchor terminal device and/or increases the maximum delay threshold.

In an embodiment, the at least one parameter increases a delay budget of the connection between the end terminal device and the access node.

In an embodiment, the at least one parameter increases priority of at least one radio link of the connection.

In an embodiment, the means comprises at least one processor and at least one memory including computer program code, wherein the at least one memory and computer program code are configured, with the at least one processor, to cause the performance of the apparatus.

According to an aspect, there is provided a method for an anchor terminal device supporting relaying between an access node and an end terminal device, comprising: receiving, by the anchor terminal device, a message requesting rerouting of said relaying, the message comprising at least one information element indicating at least one candidate terminal device; determining, by the anchor terminal device, a communication delay between the anchor terminal device and the end terminal device via at least one of said at least one candidate terminal device and comparing the determined communication delay with a maximum delay threshold; if at least one determined communication delay is smaller than the maximum delay threshold, the anchor terminal device rerouting the relaying between the anchor terminal device and the end terminal device via one of the at least one candidate terminal device that provides the communication delay smaller than the maximum delay threshold, wherein the rerouting is carried out autonomously without receiving from the access node a reconfiguration message instructing the rerouting configuration; and if no communication delay is smaller than the maximum delay threshold, the anchor terminal device transmitting a message to the access node, the message indicating a need for reconfiguration of the relaying.

In an embodiment, the anchor terminal device further receives, from the access node in response to the message indicating the need for the reconfiguration of the relaying, a new maximum delay threshold that is greater than the maximum delay threshold used in the comparison and greater than said at least one communication delay, and performs said rerouting upon receiving the new maximum delay threshold.

In an embodiment, the anchor terminal device adds one of the at least one determined communication delay to the message indicating the need for reconfiguration of the relaying.

In an embodiment, the anchor terminal device performs said rerouting by configuring a first radio link between the anchor terminal device and said one of the at least one candidate terminal device and a second radio link between the end terminal device and said one of the at least one candidate terminal device.

In an embodiment, the anchor terminal device receives the at least one information element from the end terminal device, wherein the at least one information element indicating the at least one candidate terminal device comprises measurement data of at least one radio link between the end terminal device and the at least one candidate terminal device and/or measurement data of at least one radio link between the anchor terminal device and the at least one candidate terminal device, and selects said one of the at least one candidate terminal device on the basis of the measurement data.

In an embodiment, the measurement data comprises at least one of the following parameters:

at least one of the following communication delays: at least one communication delay between the end terminal device and the at least one candidate terminal device, at least one communication delay between the end terminal device and the anchor terminal device via the at least one candidate terminal device, and at least one communication delay between the anchor terminal device and the at least one candidate terminal device;

at least one of the following channel quality metrics: at least one channel quality metric of a radio channel between the end terminal device and the at least one candidate terminal device and at least one channel quality metric of a radio channel between the anchor terminal device and the at least one candidate terminal device.

In an embodiment, the anchor terminal device further performs the following:

determining, on the basis of the measurement data, whether or not to measure a radio link between the anchor terminal device and the at least one candidate terminal device, measure, upon determining to measure the radio link between the anchor terminal device and the at least one candidate terminal device, at least one of a communication delay and channel quality metric of the radio link between the anchor terminal device and the at least one candidate terminal device, and select said one of the at least one candidate terminal device on the basis of the measurement data and the measured at least one of the communication delay and channel quality metric of the radio link between the anchor terminal device and the at least one candidate terminal device.

According to an aspect, there is provided a method for an end terminal device supporting relaying of a connection to an access node via an anchor terminal device, comprising: determining, by the end terminal device in a situation where the connection is via the anchor terminal device, a need to reroute the relaying; performing, by the end terminal device, a relay discovery procedure and detecting, on the basis of the relay discovery procedure, at least one candidate terminal device for the rerouting; determining, by the end terminal device on the basis of the relay discovery procedure, measurement data of at least one of a radio link between the end terminal device and the at least one candidate terminal device and a radio link between the anchor terminal device and the at least one candidate terminal device; transmitting, by the end terminal device, a message to the anchor terminal device, the message requesting rerouting of said relaying and comprising at least one information element indicating the at least one candidate terminal device, wherein the at least one information element indicating the at least one candidate terminal device comprises the measurement data; receiving, by the end terminal device, a rerouting configuration message indicating one of the at least one candidate terminal device, and in response to the rerouting configuration message, establishing by the end terminal device a relay route to the anchor terminal device via said one of the at least one candidate terminal device.

In an embodiment, the end terminal device measures or receives, from the at least one candidate terminal device, at least one of the following parameters:

at least one of the following communication delays: at least one communication delay between the end terminal device and the at least one candidate terminal device, at least one communication delay between the end terminal device and the anchor terminal device via the at least one candidate terminal device, and at least one communication delay between the anchor terminal device and the at least one candidate terminal device;

at least one of the following channel quality metrics: at least one channel quality metric of a radio channel between the end terminal device and the at least one candidate terminal device and at least one channel quality metric of a radio channel between the anchor terminal device and the at least one candidate terminal device.

In an embodiment, the message transmitted to the anchor terminal device comprises at least one information element indicating whether the relay discovery procedure is based on:

unidirectional discovery where the means are configured to receive at least one broadcast discovery message from the at least candidate terminal device; or bidirectional discovery where the means are configured to initiate the relay discovery procedure by transmitting a discovery request message and to receive a discovery response message from the at least one candidate terminal device.

According to an aspect, there is provided a method for an access node supporting relaying of a connection to an end terminal device via an anchor terminal device, comprising: receiving, by the access node from the anchor terminal device in a situation where a communication delay between the anchor terminal device and the end terminal device via a further terminal device is smaller than a maximum delay threshold, a notification that the anchor terminal device has performed autonomous rerouting of the connection via the further terminal device and, in response to said receiving the notification, storing by the access node information on the rerouting; and receiving, by the access node from the anchor terminal device in a situation where the communication delay between the anchor terminal device and the end terminal device via the further terminal device is greater than the maximum delay threshold, a message indicating a need for reconfiguration of the relaying and, in response to said receiving the message, reconfiguring by the access node at least one parameter of the connection to enable said rerouting, wherein the at least one parameter reduces the communication delay between the end terminal device and the anchor terminal device and/or increases the maximum delay threshold.

In an embodiment, the at least one parameter increases a delay budget of the connection between the end terminal device and the access node.

In an embodiment, the at least one parameter increases priority of at least one radio link of the connection.

According to an aspect, there is provided a computer program product embodied on a computer-readable medium and comprising a computer program code readable by a computer, wherein the computer program code configures the computer to carry out a computer process for an anchor terminal device supporting relaying between an access node and an end terminal device, the computer process comprising: receiving a message requesting rerouting of said relaying, the message comprising at least one information element indicating at least one candidate terminal device; determining a communication delay between the anchor terminal device and the end terminal device via at least one of said at least one candidate terminal device and comparing the determined communication delay with a maximum delay threshold; if at least one determined communication delay is smaller than the maximum delay threshold, rerouting the relaying between the anchor terminal device and the end terminal device via one of the at least one candidate terminal device that provides the communication delay smaller than the maximum delay threshold, wherein the rerouting is carried out autonomously without receiving from the access node a reconfiguration message instructing the rerouting configuration; and if no communication delay is smaller than the maximum delay threshold, causing transmission of a message to the access node, the message indicating a need for reconfiguration of the relaying.

According to an aspect, there is provided a computer program product embodied on a computer-readable medium and comprising a computer program code readable by a computer, wherein the computer program code configures the computer to carry out a computer process for an end terminal device supporting relaying of a connection to an access node via an anchor terminal device, the computer process comprising: determining, in a situation where the connection is via the anchor terminal device, a need to reroute the relaying; performing a relay discovery procedure and detecting, on the basis of the relay discovery procedure, at least one candidate terminal device for the rerouting; determining, on the basis of the relay discovery procedure, measurement data of at least one of a radio link between the end terminal device and the at least one candidate terminal device and a radio link between the anchor terminal device and the at least one candidate terminal device; causing transmission of a message to the anchor terminal device, the message requesting rerouting of said relaying and comprising at least one information element indicating the at least one candidate terminal device, wherein the at least one information element indicating the at least one candidate terminal device comprises the measurement data; receiving a rerouting configuration message indicating one of the at least one candidate terminal device, and in response to the rerouting configuration message, establishing a relay route to the anchor terminal device via said one of the at least one candidate terminal device.

According to an aspect, there is provided a computer program product embodied on a computer-readable medium and comprising a computer program code readable by a computer, wherein the computer program code configures the computer to carry out a computer process for an access node supporting relaying of a connection to an end terminal device via an anchor terminal device, the computer process comprising: receiving, from the anchor terminal device in a situation where a communication delay between the anchor terminal device and the end terminal device via a further terminal device is smaller than a maximum delay threshold, a notification that the anchor terminal device has performed autonomous rerouting of the connection via the further terminal device and, in response to said receiving the notification, storing information on the rerouting; and receiving, from the anchor terminal device in a situation where the communication delay between the anchor terminal device and the end terminal device via the further terminal device is greater than the maximum delay threshold, a message indicating a need for reconfiguration of the relaying and, in response to said receiving the message, reconfiguring at least one parameter of the connection to enable said rerouting, wherein the at least one parameter reduces the communication delay between the end terminal device and the anchor terminal device and/or increases the maximum delay threshold.

LIST OF DRAWINGS

Embodiments are described below, by way of example only, with reference to the accompanying drawings, in which FIG. 1 illustrates a wireless communication scenario to which some embodiments of the invention may be applied;

FIG. 2 illustrates a relaying scenario to which embodiments of the invention may be applied;

FIGS. 3, 4, and 5 illustrate flow diagrams of processes for performing rerouting of relayed connection according to some embodiments;

DESCRIPTION OF EMBODIMENTS

The following embodiments are examples. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments. Furthermore, words "comprising" and "including" should be understood as not limiting the described embodiments to consist of only those features that have been mentioned and such embodiments may contain also features/structures that have not been specifically mentioned.

In the following, different exemplifying embodiments will be described using, as an example of an access architecture to which the embodiments may be applied, a radio access architecture based on long term evolution advanced (LTE Advanced, LTE-A) or new radio (NR, 5G), without restricting the embodiments to such an architecture, however. A person skilled in the art will realize that the embodiments may also be applied to other kinds of communications networks having suitable means by adjusting parameters and procedures appropriately. Some examples of other options for suitable systems are the universal mobile telecommunications system (UMTS) radio access network (UTRAN or E-UTRAN), long term evolution (LTE, the same as E-UTRA), wireless local area network (WLAN or WiFi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
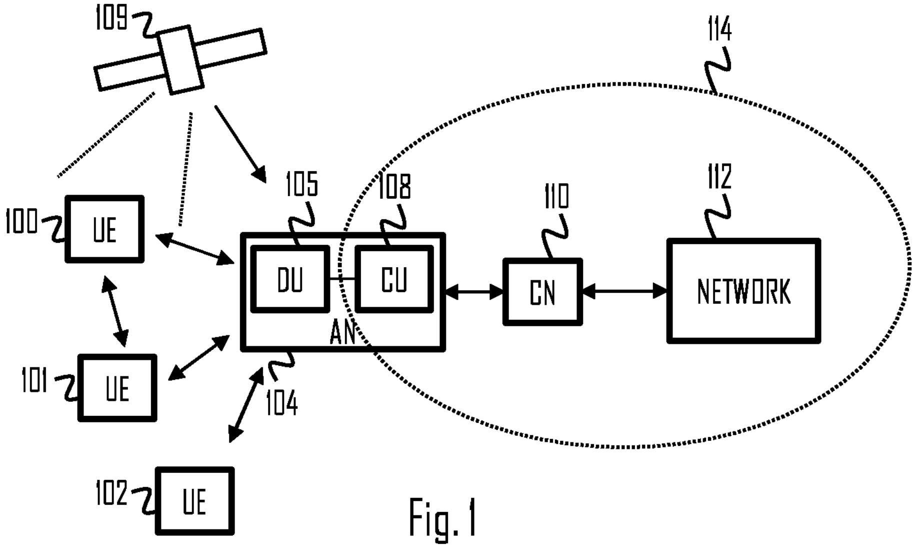

FIG. 1 depicts examples of simplified system architectures only showing some elements and functional entities, all being logical units, whose implementation may differ from what is shown. The connections shown in FIG. 1 are logical connections; the actual physical connections may be different. It is apparent to a person skilled in the art that the system typically comprises also other functions and structures than those shown in FIG. 1.

The embodiments are not, however, restricted to the system given as an example but a person skilled in the art may apply the solution to other communication systems provided with necessary properties.

The example of FIG. 1 shows a part of an exemplifying radio access network.

FIG. 1 shows terminal devices or user devices 100, 101, and 102 configured to be in a wireless connection on one or more communication channels in a cell with an access node AN (such as (e/g) NodeB) 104 providing the cell. (e/g) NodeB refers to an eNodeB or a gNodeB, as defined in 3GPP specifications. The physical link from a user device to a (e/g) NodeB is called uplink or reverse link and the physical link from the (e/g) NodeB to the user device is called downlink or forward link. It should be appreciated that (e/g) NodeBs or their functionalities may be implemented by using any node, host, server or access point etc. entity suitable for such a usage.

A communications system typically comprises more than one (e/g) NodeB in which case the (e/g) NodeBs may also be configured to communicate with one another over links, wired or wireless, designed for the purpose. These links may be used not only for signalling purposes but also for routing data from one (e/g) NodeB to another. The (e/g) NodeB is a computing device configured to control the radio resources of communication system it is coupled to. The NodeB may also be referred to as a base station, an access point, an access node, or any other type of interfacing device including a relay station capable of operating in a wireless environment. The (e/g) NodeB includes or is coupled to transceivers. From the transceivers of the (e/g) NodeB, a connection is provided to an antenna unit that establishes bi-directional radio links to user devices. The antenna unit may comprise a plurality of antennas or antenna elements. The (e/g) NodeB is further connected to a core network 110 (CN or next generation core NGC). Depending on the system, the counterpart on the CN side can be a serving gateway (S-GW, routing and forwarding user data packets), packet data network gateway (P-GW), for providing connectivity of user devices (UEs) to external packet data networks, or mobile management entity (MME), etc.

The user device (also called user equipment UE, user terminal, terminal device, etc.) illustrates one type of an apparatus to which resources on the air interface are allocated and assigned, and thus any feature described herein with a user device may be implemented with a corresponding apparatus, such as a relay node. An example of such a relay node is a layer 3 relay (self-backhauling relay) towards the base station. 5G specifications define two relay modes: out-of-band relay where same or different carriers may be defined for an access link and a backhaul link; and in-band-relay where the same carrier frequency or radio resources are used for both access and backhaul links. In-band relay may be seen as a baseline relay scenario. A relay node is called an integrated access and backhaul (IAB) node. It has also inbuilt support for multiple relay hops. IAB operation assumes a so-called split architecture having CU and a number of DUs. An IAB node contains two separate functionalities: DU (Distributed Unit) part of the IAB node facilitates the gNB (access node) functionalities in a relay cell, i.e. it serves as the access link; and a mobile termination (MT) part of the IAB node that facilitates the backhaul connection. A Donor node (DU part) communicates with the MT part of the IAB node, and it has a wired connection to the CU which again has a connection to the core network. In the multihop scenario, MT part (a child IAB node) communicates with a DU part of the parent IAB node.

The user device typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example is a camera or video camera loading images or video clips to a network. A user device may also be a device having capability to operate in Internet of Things (IoT) network which is a scenario in which objects are provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation is carried out in the cloud. The user device (or in some embodiments a layer 3 relay node) is configured to perform one or more of user equipment functionalities. The user device may also be called a subscriber unit, mobile station, remote terminal, access terminal, user terminal or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question has inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications supports a wide range of use cases and related applications including video streaming, augmented reality, different ways of data sharing and various forms of machine type applications (such as (massive) machine-type communications (mMTC), including vehicular safety, different sensors and real-time control. 5G is expected to have multiple radio interfaces, namely below 6 GHz, cmWave and mmWave, and also being capable of being integrated with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as below 6 GHz-cmWave, below 6 GHz-cmWave-mmWave). One of the concepts considered to be used in 5G networks is network slicing in which multiple independent and dedicated virtual sub-networks (network instances) may be created within the same infrastructure to run services that have different requirements on latency, reliability, throughput and mobility.

The current architecture in LTE networks is fully distributed in the radio and typically fully centralized in the core network. The low-latency applications and services in 5G require to bring the content close to the radio which leads to local break out and multi-access edge computing (MEC). 5G enables analytics and knowledge generation to occur at the source of the data. This approach requires leveraging resources that may not be continuously connected to a network such as laptops, smartphones, tablets and sensors. MEC provides a distributed computing environment for application and service hosting. It also has the ability to store and process content in close proximity to cellular subscribers for faster response time. Edge computing covers a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system is also able to communicate with other networks 112, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head or base station comprising radio parts. It is also possible that node operations will be distributed among a plurality of servers, nodes or hosts. Application of cloud RAN architecture enables RAN real time functions being carried out at the RAN side (in a distributed unit, DU 105) and non-real time functions being carried out in a centralized manner (in a centralized unit, CU 108).

It should also be understood that the distribution of functions between core network operations and base station operations may differ from that of the LTE or even be non-existent. Some other technology advancements probably to be used are Big Data and all-IP, which may change the way networks are being constructed and managed. 5G (or new radio, NR) networks are being designed to support multiple hierarchies, where MEC servers can be placed between the core and the base station or node B (gNB). It should be appreciated that MEC can be applied in 4G networks as well.

5G may also utilize satellite communication to enhance or complement the coverage of 5G service, for example by providing backhauling. Possible use cases are providing service continuity for machine-to-machine (M2M) or Internet of Things (IoT) devices or for passengers on board of vehicles, or ensuring service availability for critical communications, and future railway, maritime, and/or aeronautical communications. Satellite communication may utilize geostationary earth orbit (GEO) satellite systems, but also low earth orbit (LEO) satellite systems, in particular mega-constellations (systems in which hundreds of (nano) satellites are deployed). Each satellite in the mega-constellation may cover several satellite-enabled network entities 109 that create on-ground cells. The on-ground cells may be created through an on-ground relay node or by a gNB located on-ground or in a satellite 109.

It is obvious for a person skilled in the art that the depicted system is only an example of a part of a radio access system and in practice, the system may comprise a plurality of (e/g) NodeBs, the user device may have an access to a plurality of radio cells and the system may comprise also other apparatuses, such as physical layer relay nodes or other network elements, etc. At least one of the (e/g) NodeBs or may be a Home (e/g) nodeB. Additionally, in a geographical area of a radio communication system a plurality of different kinds of radio cells as well as a plurality of radio cells may be provided. Radio cells may be macro cells (or umbrella cells) which are large cells, usually having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. Typically, in multilayer networks, one access node provides one kind of a cell or cells, and thus a plurality of (e/g) NodeBs are required to provide such a network structure.

Figure 2:
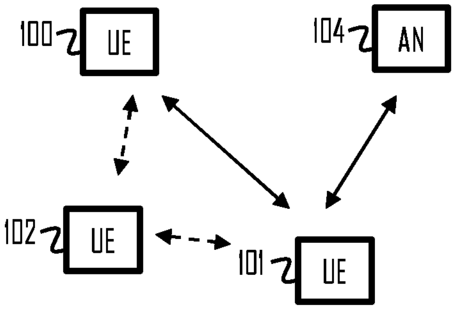

Referring to FIG. 1, let us consider an initial situation where a radio connection (e.g. a radio resource control, RRC, connection) of the terminal device 100 is relayed to the access node 104 by the terminal device 101. In terms of protocol layers, the terminal device 100 may communicate with the access node 104 on a link layer (Layer 2 or L2) and above but with the relay terminal device 101 on a physical layer (Layer 1 or L1) and above. 3GPP specifications acknowledge such a scenario as L2 U2N relay, meaning Layer 2 UE-to-Network relaying. A radio link for the relaying between the terminal devices 100 and 101 may be called a sidelink that may follow the definitions of the sidelink in the 3GPP specifications. FIG. 2 illustrates a situation where the terminal devices 100 and 101 may have moved away from one another because of the mobility. In such a case, the quality of the sidelink may deteriorate and raise a need for rerouting the connection. For example, the terminal device 102 that is closer to the terminal device 100 may be a potential candidate for the rerouting.

Regarding terminology in the following description, the terminal device 100 is generally called an end terminal device due to that the connection is terminated at the end terminal device. The terminal device 101 serving as a relay before and after rerouting is called an anchor terminal device due to that it anchors the end terminal device 100 to the access node 104. The terminal device 102 is generally called a candidate terminal device due to that it is a potential candidate for rerouting the connection to provide the relay extension described in Background.

Figure 3:
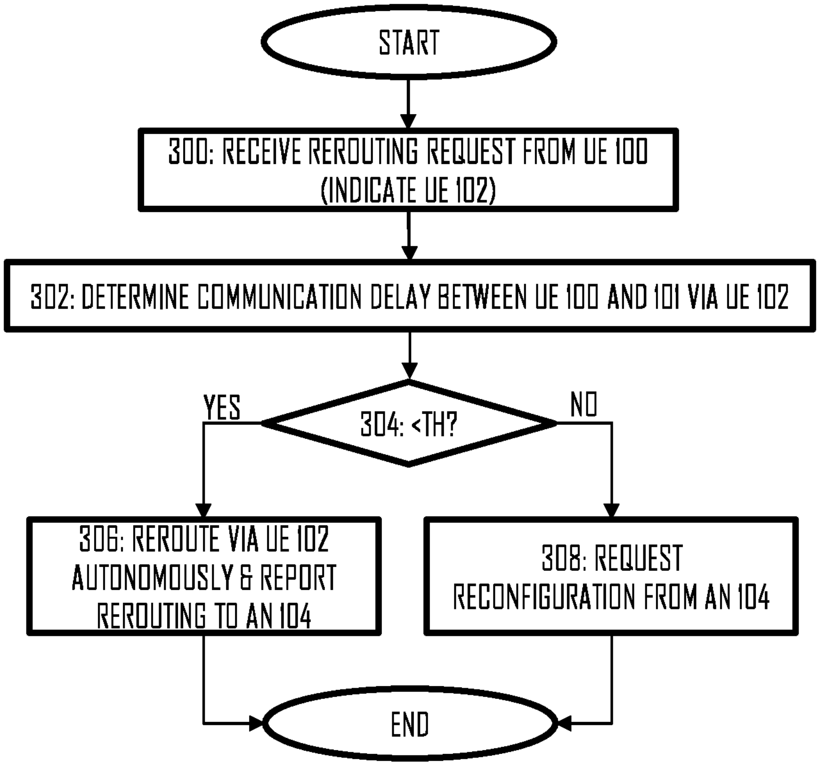
Figure 4:
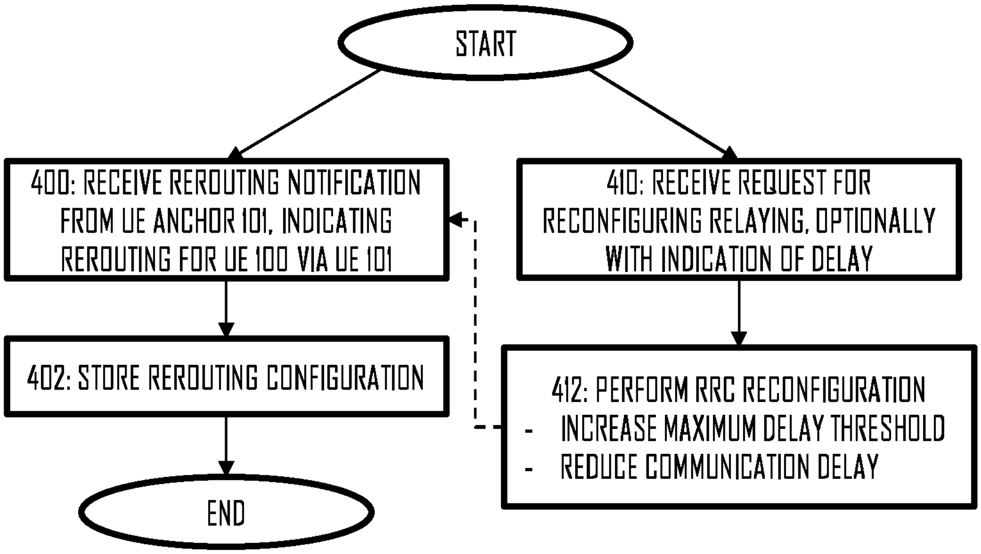
Figure 5:
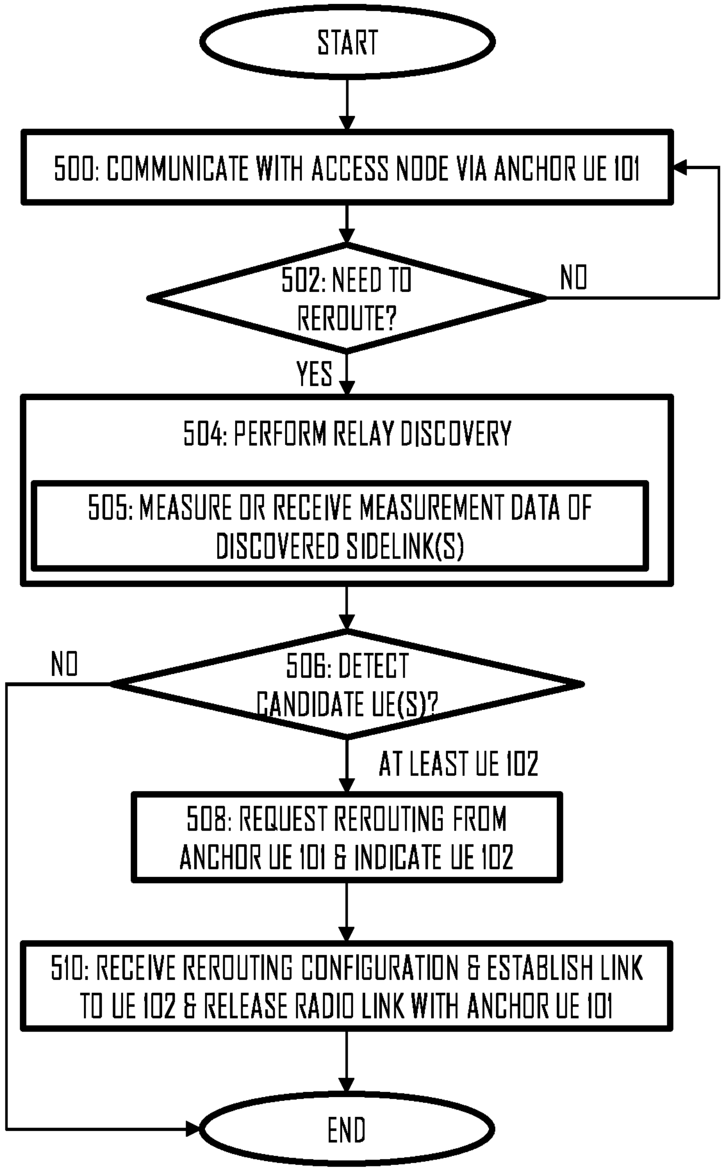

As disclosed in Background, there is a need for efficient configuration of the relay extension over multiple hops. FIGS. 3 to 5 illustrate embodiments of processes for performing such rerouting. FIG. 3 illustrates a process for the anchor terminal device 101, FIG. 4 illustrates a process for the access node 104, and FIG. 5 illustrates a process for the end terminal device.

Referring to FIG. 3, the process performed in an apparatus for the anchor terminal device 101 comprises: receiving (block 300), from the end terminal device, a message requesting rerouting of said relaying, the message comprising at least one information element indicating at least one candidate terminal device (the terminal device 102); determining (block 302) a communication delay between the anchor terminal device and the end terminal device via at least one (or each) of said at least one candidate terminal device and comparing (block 304) the determined communication delay with a maximum delay threshold; if at least one determined communication delay is smaller than the maximum delay threshold, rerouting (block 306) the relaying between the anchor terminal device and the end terminal device via one of the at least one candidate terminal device that provides the communication delay smaller than the maximum delay threshold, wherein the rerouting is carried out without approval from the access node; and if no communication delay is smaller than the maximum delay threshold, causing (block 308) transmission of a message to the access node, the message indicating a need for reconfiguration of the relaying.

In an embodiment, if the communication delays are above another threshold greater than the maximum delay threshold, e.g. all the communication delays are above the other threshold, the apparatus may determine that the rerouting cannot be performed even with the support from the access node and the terminal device may skip block 308 and not request for the reconfiguration of the relaying.

Referring to FIG. 4, the process performed in an apparatus for the access node 104 comprises: receiving (block 400), from the anchor terminal device in a situation where a communication delay between the anchor terminal device and the end terminal device via a further terminal device is smaller than a maximum delay threshold, a notification that the anchor terminal device has performed autonomous rerouting of the connection via the further terminal device and, in response to said receiving the notification, storing (block 402) information on the rerouting; and receiving (block 410), from the anchor terminal device in a situation where the communication delay between the anchor terminal device and the end terminal device via the further terminal device is greater than the maximum delay threshold, a message indicating a need for reconfiguration of the relaying and, in response to said receiving the message, reconfiguring (block 412) at least one parameter of the connection to enable said rerouting, wherein the at least one parameter reduces the communication delay between the end terminal device and the anchor terminal device and/or increases the maximum delay threshold.

In an embodiment, if the rerouting is now possible in terms of the communication delay, the process may proceed from block 412 to block 400.

Referring to FIG. 5, the process performed in an apparatus for the end terminal device 100 comprises: determining (block 502), in a situation where the connection is via the anchor terminal device (block 500), a need to reroute the relaying; performing (block 504) a relay discovery procedure and detecting (block 506), on the basis of the relay discovery procedure, at least one candidate terminal device for the rerouting; determining (block 505), during or on the basis of the relay discovery procedure, measurement data of at least one of a radio link between the end terminal device and the at least one candidate terminal device and a radio link between the anchor terminal device and the at least one candidate terminal device; causing (block 508) transmission of a message to the anchor terminal device, the message requesting rerouting of said relaying and comprising at least one information element indicating the at least one candidate terminal device, wherein the at least one information element indicating the at least one candidate terminal device comprises the measurement data; receiving (block 510), from the anchor terminal device, a rerouting configuration message indicating one of the at least one candidate terminal device and, in response to the rerouting configuration message, establishing (block 510) a relay route to the anchor terminal device via said one of the at least one candidate terminal device and, optionally, releasing a relay radio link with the anchor terminal device.

As illustrated in FIG. 5, the relay discovery procedure may be responsive to the detection of the need for rerouting. The need may be based on detecting that channel quality of the sidelink between the terminal devices 100, 101 has fallen below a determined threshold level. There may be other indicators of the need as well. For example, the end terminal device may detect the terminal device 101 and determine that it may provide a better sidelink than the anchor terminal device. Another indicator may be problems in the sidelink with the anchor terminal device 101, such as temporary unavailability of the sidelink or degradation in one or more Quality-of-Service (QOS) parameters of the sidelink.

The embodiments described above in connection with FIGS. 3 to 5 provide a simple reconfiguration of the relaying with low signaling overhead. For example, if the anchor terminal device determines that the autonomous rerouting can be made, it will not request the rerouting from the access node 104 but, instead, performs the rerouting autonomously and only informs the access node of the rerouting. Therefore, signaling particularly in the interface between the anchor terminal device and the access node is low. The anchor terminal device requests the access node to perform the reconfiguration only when the anchor terminal device is incapable of performing the rerouting within the configured limits, e.g. within the maximum allowable delay defined by the maximum delay threshold.

It should be noted that while most embodiments described herein concentrate on the presence of only one candidate terminal device 102, there may be more than one candidate terminal device for the rerouting in all embodiments.

In an embodiment, the rerouting is performed by the anchor terminal device 101 by releasing a radio link with the end terminal device 100 and by configuring a radio link from the anchor terminal device to the candidate terminal device 102 and a radio link between the end terminal device 100 and the candidate terminal device 102. Further description of this is provided below with reference to FIGS. 6, 8, and 10.

Figure 6:
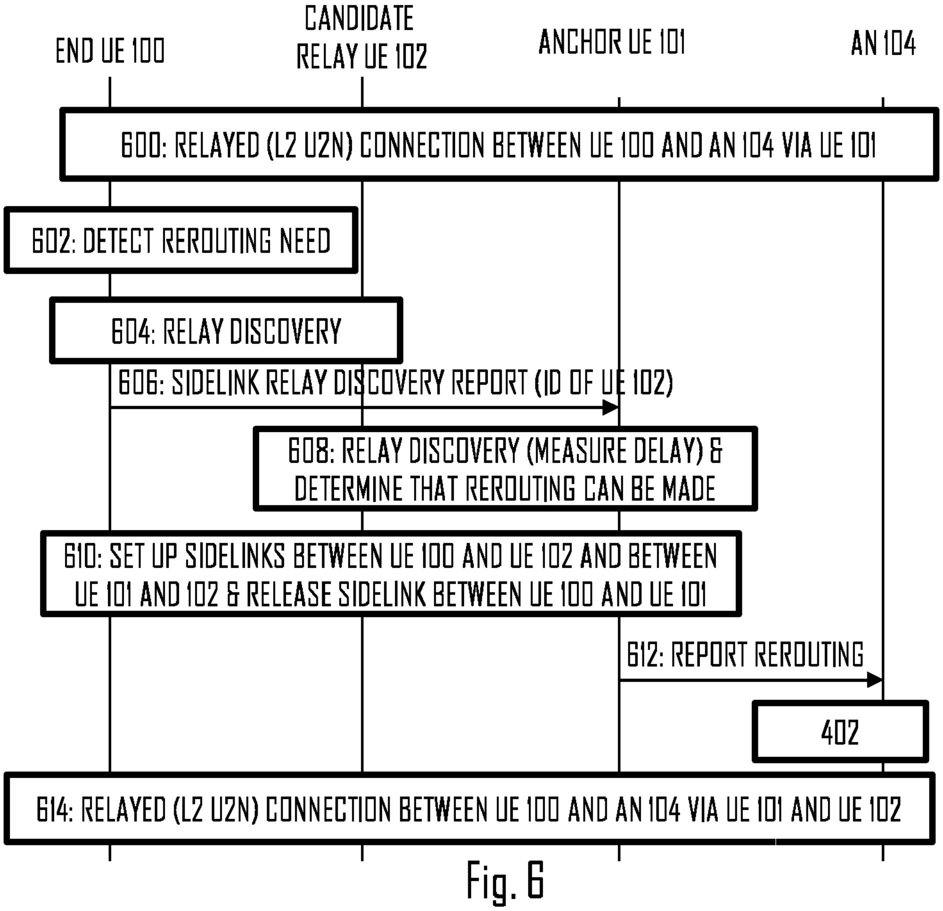
FIGS. 6 and 8 illustrate signalling diagrams of embodiments for performing autonomous rerouting of the relayed connection.

Let us then describe some embodiments of the processes of FIGS. 3 to 5 with reference to signalling diagrams of FIGS. 6 to 10. FIG. 6 illustrates a signalling diagram of an embodiment where the anchor terminal device (anchor UE) 101 performs the rerouting autonomously. An initial situation represented by block 600 may be that the anchor terminal device 101 operates as the serving L2 U2N relay of the end terminal device 100 and has a certain control over the relayed connection of the end terminal device 100. For example, the anchor terminal device may control operation of the relayed connection over the sidelink, including selection of the routing for the relayed connection. As described above, Layer 2 and above connection may then be configured between the end terminal device 100 and the access node (AN) 104. In block 602, the end terminal device detects the need for rerouting, e.g. upon measuring that a channel quality of the sidelink with the anchor terminal device has degraded. Sidelink reference signal reception power (SL-RSRP) measured by the end terminal device from a reference signal received from the anchor terminal device may be used as an indicator of the channel quality, as known in the art. The detection in block 602 may trigger the relay discovery procedure where the end terminal device performs a discover procedure where it searches for candidate terminal devices for serving as an additional relay terminal device for the end terminal device. 3GPP specifications describe two discovery models: Model-A and Model-B. Model-A is based on the end terminal device scanning passively for broadcast announcements transmitted by the other terminal devices, while Model-B is an active scanning method where the end terminal device transmits a relay discovery (RD) solicitation message over a sidelink, and one or more terminal devices detecting the RD solicitation message may respond to it, thereby allowing the end terminal device to discover the one or more terminal devices that would be candidate terminal devices for the rerouting.

The end terminal device 100 may acquire, during the relay discovery procedure in block 604, at least an identifier of the one or more candidate relay terminal devices, including the UE 102. The identifier may be a sidelink Layer 2 identifier (SL L2 ID). The end terminal device may further discover whether or not the one or more terminal devices are providing a relay service that would be capable for the relaying. The required relay service may in this case be an L2 or L3 U2U (UE-to-UE) relay service. The end terminal device may further discover a coverage status of the one or more terminal devices, e.g. out-of-coverage or in-coverage. The coverage status may indicate whether or not the one or more terminal devices are in a coverage area of a network or a cell of an access node of a network and, optionally, a network identifier or a cell identifier of the cell or the access node of a network. Further exposable context information may be acquired by the end terminal device during the relay discovery, such as a battery status of the one or more terminal devices, channel state information, relay capacity or load, and/or relay capability information. On the basis of the information acquired during the relay discovery, the end terminal device may select the at least one candidate terminal devices for the rerouting. For example, if a terminal device provides the required relay service, the terminal device may be selected as the candidate terminal device. Further criteria may be used, e.g. requirement to be in-coverage, battery status above a certain level, channel state information above a certain level, and/or sufficient relay capacity to provide the relaying. In some cases, the end terminal device may select all discovered terminal devices providing a relay service as the candidate terminal devices. Then, the end terminal device may generate a sidelink relay discovery report comprising at least identifier(s) of the discovered and selected candidate terminal devices. The relay discovery report is transmitted to the anchor terminal device in step 606.

Upon receiving the relay discovery report, the anchor terminal device may carry out a relay discovery procedure with the candidate terminal device(s) in block 608, the candidate terminal device 102 in this case. In some cases, the relay discovery in block 608 may be omitted, as described below. Block 608 further comprises determination of whether or not the rerouting can be configured without involving the access node 104. The determination may be based on the following conditions. The anchor terminal device may determine not to set up the rerouting due to one of the following reasons: in case the anchor relay terminal device performs the relay discover procedure in block 608 and does not discover a particular terminal device in its proximity; the anchor terminal device does discover the candidate terminal device in its proximity but a channel quality in terms of a measured RSRP between the anchor terminal device and the candidate terminal device is not high enough (below a minimum configurable threshold); or other reasons such as load or channel conditions of anchor terminal device or the candidate terminal device (provided in the report or obtained during the discovery in block 608). As described above, the communication delay between the anchor terminal device and the end terminal device via the candidate relay terminal device is one criterion in the determination of block 608. The communication delay may include a delay of the link between the terminal devices 100, 102 and/or a delay between the terminal devices 101, 102. The complete delay from the anchor terminal device 101 to the end terminal device via the candidate terminal device 102 would provide the most accurate information for the comparison in block 304, but a delay of one of the two links may be sufficient in some cases. A different maximum delay threshold may be used, depending on whether the delay of only one or both links is used, and the respective maximum delay threshold may be adapted to the number of considered links according to the design.

Figure 7:
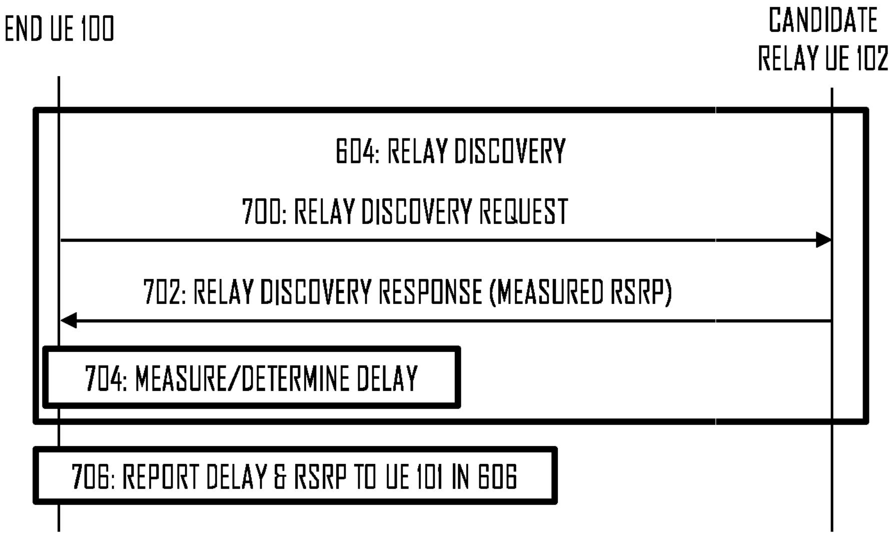
FIGS. 7 and 9 illustrate embodiments for performing a relay discovery procedure.

The end terminal device may measure the delay of the link with the candidate relay terminal device during the relay discovery procedure in block 604, when Model-B type of discovery is used. FIG. 7 illustrates such a discovery procedure. As described above, Model-B discovery is based on the end terminal device transmitting a relay discovery request message (RD solicitation) in step 700, and the terminal devices supporting the relaying and detecting the relay discovery request in step 700 may respond with a relay discover response message (RD solicitation response) in step 702. The end terminal device may indicate in the relay discover request an identifier (e.g. sidelink L2 ID) of the anchor terminal device 101 and a relay discovery model and relay discovery resources the anchor terminal device 101 is using when discovery the candidate terminal devices for the rerouting (in block 608). This allows the candidate terminal devices to first discover the current anchor terminal device 101 during the relay discovery in block 604 efficiently before deciding to respond to the relay discovery request. For example, if the candidate terminal device 102 would not be able to discover the anchor terminal device 101, it would not respond to the relay discovery request. In this case, let us assume that the candidate terminal device 102 is capable of detecting the anchor terminal device and sends the relay discovery response in step 702. The candidate terminal device may measure the channel quality from a reference signal of the relay discovery request to determine a channel state between the terminal devices 100, 102. If the candidate terminal device performs the discovery towards the anchor terminal device, it may also measure the channel state towards the anchor terminal device in a similar manner from a reference signal received from the anchor terminal device in the discovery. Similarly, the candidate terminal device 102 may also measure a delay between the anchor terminal device and the candidate terminal device during the discovery. Conventional delay measurement principles may be used, e.g. a time difference between transmission of the relay discovery request and reception of the relay discovery response, divided by two, or providing a transmission time stamp in a transmitted message and recording a reception time of the message and subtracting the transmission time from the reception time (clocks synchronized at the transmitter and receiver). Accordingly, this discovery may replace the discovery in block 608.

The response in step 702 may thus comprise at least one of the communication delay of the link between the terminal devices 101, 102, a channel quality indicator of a radio channel between the terminal devices 101, 102, and a channel quality indicator of a radio channel between the terminal devices 100, 102 (measured by the candidate terminal device 102). The end terminal device may then measure the delay between the end terminal device and the candidate terminal device and, optionally, the channel quality indicator of the radio channel between the terminal devices 100, 102 (if not included in the relay discovery response). These parameters may form measurement data that is reported to the anchor terminal device 101 in block 706, e.g. in step 606. The report may further include any context information of the candidate terminal device discovered during the relay discovery procedure of block 604, such as a network identifier, a cell identifier, an RRC state (idle, connected, etc.), a battery status, channel state information, capacity information and/or capability information of the candidate terminal device. With respect to the reported delay, the end terminal device may combine the delays of the two radio links into a single delay value that represents the delay between the terminal devices 100, 101 via the candidate terminal device 102. Provision of such a report is also an implicit indicator to the anchor terminal device that Model-B discovery has been used by the end terminal device to discover the candidate terminal device. For example, the measurement data of the radio link between the terminal devices 101, 102 would not be available unless the bidirectional discovery has been used. As described above, the report may comprise similar measurement data for other discovered candidate terminal devices, depending on whether the end terminal device or the anchor terminal devices shall select the best candidate for the relaying.

Returning to FIG. 6, in case the anchor terminal device determines to set-up the rerouting via the candidate terminal device 102, the anchor terminal device may further determine whether or not support from the serving access node 104 is needed and to what extent when setting up the rerouting. In case the terminal device determines to be capable of autonomous rerouting, e.g. the delay acquired during the one or more relay discovery procedures is below the maximum delay threshold and, optionally, if the channel quality indicators indicate sufficient channel quality in the two radio links 100-102 and 101-102. If the anchor terminal device determines that support (reconfiguration) from the access node 104 is required, e.g. a reconfiguration of a current service flow, radio bearer or logical channel of either the end terminal device or the anchor, the anchor terminal device may follow the embodiments described below. In addition to the delay and the channel state of the radio links, further serving-cell and status/condition information of the candidate terminal device 102 may be considered, if such is comprised in the report generated by the end terminal device and/or discovered in the discovery between the anchor terminal device and the candidate terminal device 102. Example of the serving-cell status is the coverage status and status/condition information may be formed by the relay capacity information. For example, if the candidate terminal device 102 is in RRC connected state in the same serving access node 104, it may be beneficial to indicate about the rerouting via the candidate terminal device 102 to the access node 104 even when the anchor terminal device 101 would be capable of autonomous rerouting. This is because the access node 104 may then be able to help enhance performance for all terminal devices 100 to 102 via, e.g., by optimizing resource allocation. The access node may also reconfigure the RRC connection between the candidate terminal device 102 and the access node to better adapt to the rerouting and overall performance of all terminal devices 100 to 102. If the candidate terminal device 102 is in RRC idle or out-of-coverage state, the candidate terminal device 102 may still be selected for the rerouting but no advance notification to the access node 104 may be necessary.

Let us now assume that the anchor terminal device is capable of performing the rerouting autonomously. As a consequence, the anchor terminal device may initiate the setup of the relay extension (rerouting) via the candidate terminal device over the sidelink with the end terminal device (step 610). The anchor terminal device may indicate to the end terminal device during the setup that the rerouting via the candidate terminal device shall be taken into use for the relayed connection upon the connection setup (distinguishing from the embodiment of FIG. 8). In an embodiment, the anchor terminal device may further indicate during the setup whether or not the sidelink connection between the terminal devices 100, 101 shall be maintained and used in parallel with the rerouted relay extension. Accordingly, both terminal devices 100, 101 may then establish sidelinks with the candidate terminal device 102, and the candidate terminal device 102 may map the two radio links to each other for performing the relaying. According to the configuration, the sidelink between the terminal devices 100, 101 may be maintained or released after the completion of the rerouting. In step 612, the anchor terminal device reports to the serving access node about the completion of the rerouting of the connection of the terminal device 100 via the terminal device 102. The anchor terminal device may use UEAssistanceInformation in the reporting. The access node may then store the new route of the connection in block 402. As a result, data and signaling information of the connection is then delivered between the end terminal device 100 and the access node 104 via both terminal devices 101, 102 (block 614).

As described above, the end terminal device may provide the anchor terminal device with measurement data measured during the relay discovery procedure of block 604. The anchor terminal device may determine, on the basis of the received measurement data, whether or not to measure the radio link (sidelink) between the anchor terminal device and the candidate terminal device 102 reported by the end terminal device. In other words, the anchor terminal device determines whether or not to perform the additional discovery in block 608. For example, if the relay discovery in block 604 readily includes the discovery between the terminal devices 101, 102, all the needed measurement data may be readily available. On the other hand, if there is no measurement data of the sidelink between the terminal devices 101, 102, the anchor terminal device may carry out the additional discovery to acquire the measurement data, e.g. delay and optionally the channel quality of the sidelink between the terminal devices 101, 102. Upon gathering the communication delay and, optionally, channel quality metric of the candidate terminal devices, the anchor terminal device may select one of the candidate terminal device(s) on the basis of the measured at least one of the communication delay and channel quality metric. For example, a candidate terminal device capable of providing the lowest delay and, optionally, the best channel quality may be selected.

Figure 8:
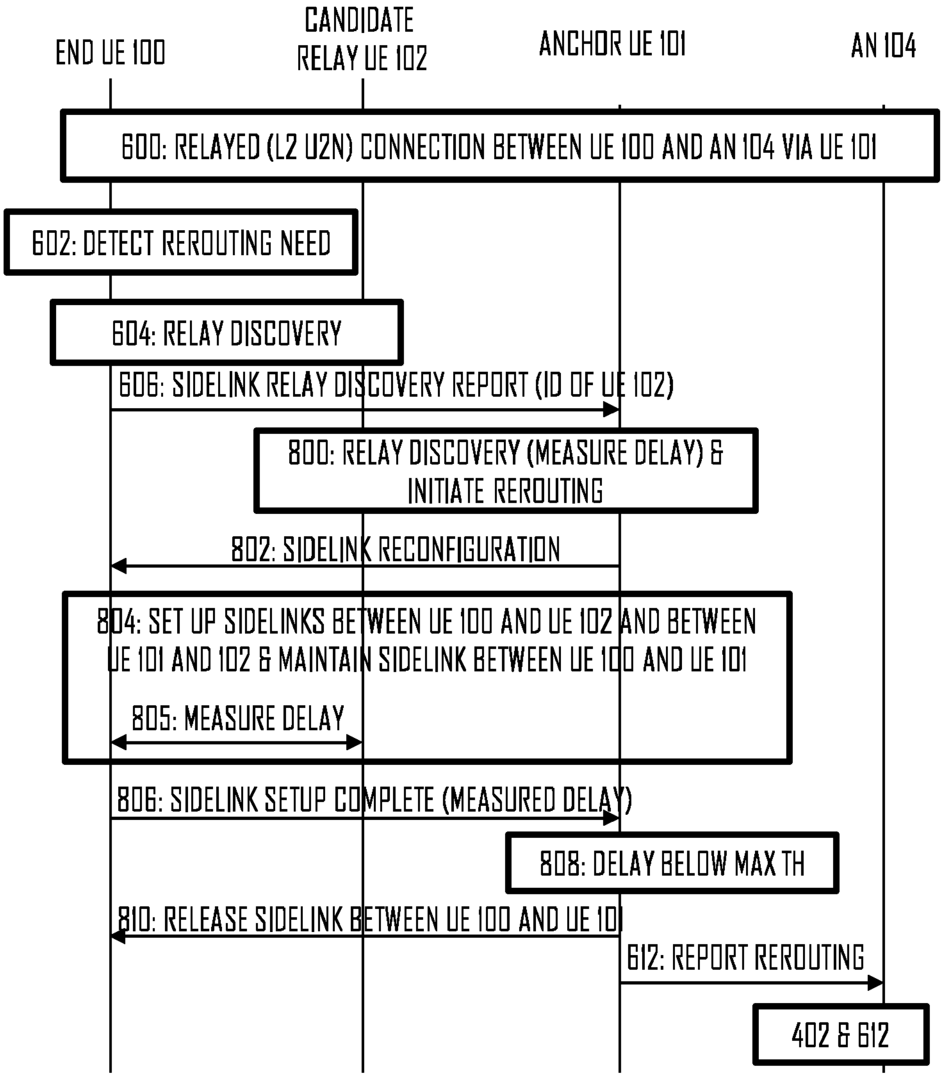
Figure 9:
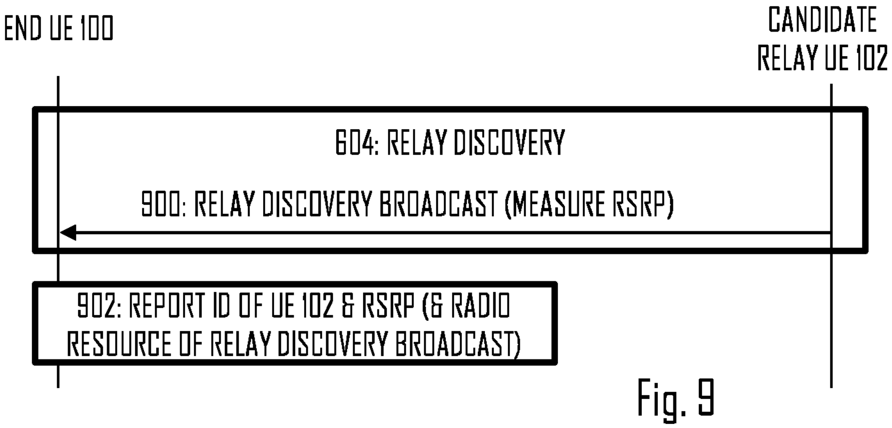

FIG. 8 illustrates an embodiment that distinguishes from the embodiment of FIG. 6 with that the end terminal device performs the unidirectional discovery procedure in block 604. Besides block 604, the steps denoted by the same reference signs represent the same or substantially similar procedures. Let us first describe the unidirectional discovery with reference to FIG. 9. Referring to FIG. 9, the end terminal device may in the unidirectional relay discovery scan for broadcast messages from terminal devices that provide the required relay service. Upon discovering a discovery broadcast message from one or more such candidate terminal devices in step 900, the end terminal device may collect at least an identifier of the one or more candidate terminal devices and, optionally, measure the channel quality (e.g. RSRP) from a reference signal comprised in the discovery broadcast message(s). The end terminal device may then report to the anchor terminal device the identifier(s) of the detected candidate terminal device(s) in block 902. In an embodiment, the end terminal device includes in the report radio resources used by each detected candidate terminal device for transmitting the discovery broadcast message. This would facilitate the additional relay discovery procedure, if the anchor terminal device chooses to carry that. The reason is that the anchor terminal device may start the relay discovery procedure in the reported radio resource without a need to first scan through multiple radio resources. It also implicitly indicates that the end terminal device has used the unidirectional discovery procedure and, for example, the delay information is not included in the report. The reported identifier of the candidate terminal device 102 may be a sidelink (SL) L2 identifier.

Upon receiving the report in step 606, the anchor terminal device may now need to carry out the additional relay discovery procedure because it may not yet have any information on the delay between the terminal devices 100, 101 via the terminal device 102. The anchor terminal device may perform the bidirectional relay discovery procedure described above in connection with FIG. 7 and acquire the delay between at least the candidate terminal device and the anchor terminal device. The anchor terminal device may address the relay discovery request to the SL L2 identifier received in the report in step 606. Further, the anchor terminal device may acquire the channel quality information of the radio channel between the terminal devices 101, 102. Upon acquiring the delay, during the additional relay discovery procedure, or even between step 606 and the additional relay discovery procedure, the anchor terminal device may initiate the setup of the rerouting with the end terminal device (step 802). Step 802 may indicate to the end terminal device that the end terminal device may start the setup of the rerouting via the terminal device but that the rerouting shall not be effective before confirmation from the anchor terminal device. The message transferred in step 802 may further configure the end terminal device to measure the delay between the end terminal device and the candidate terminal device and report the delay to the anchor terminal device. In block 804, the end terminal device establishes the sidelink with the candidate terminal device and measures the delay (step 805). Meanwhile, the anchor terminal device may establish a sidelink with the candidate terminal device to also prepare for the rerouting. However, the direct sidelink between the end terminal device and the anchor terminal device may be maintained because the measured delay may be reported over the sidelink in step 806, e.g. in connection with a message indicating that the end terminal device has established the sidelink with the candidate terminal device. Upon receiving the delay, the anchor terminal device may add the received delay to the delay it has measured between the anchor terminal device and the candidate terminal device. The summed delay may then be compared with the maximum delay threshold in the above-described manner. Let us assume in this case that the delay is below the maximum delay threshold, indicating that the anchor terminal device may perform the autonomous rerouting. As a consequence, the anchor terminal device may finalize the rerouting by indicating the release of the sidelink between the terminal devices 100, 101 to the end terminal device 100 in step 810. Additionally, the anchor terminal device may report the rerouting to the access node in step 612 in the above-described manner. And as described above, the access node may store new route and deliver data from/to the end terminal device via the newly formed route via the terminal device 102.

To summarize reporting the relay discovery procedure used by the end terminal device, the message transmitted by the end terminal device to the anchor terminal device comprises at least one information element indicating whether the relay discovery procedure is based on: unidirectional discovery where the end terminal device received at least one broadcast discovery message from the at least candidate terminal device; or bidirectional discovery where the end terminal device initiated the relay discovery procedure by transmitting a discovery request message and to receive a discovery response message from the at least one candidate terminal device.

Figure 10:
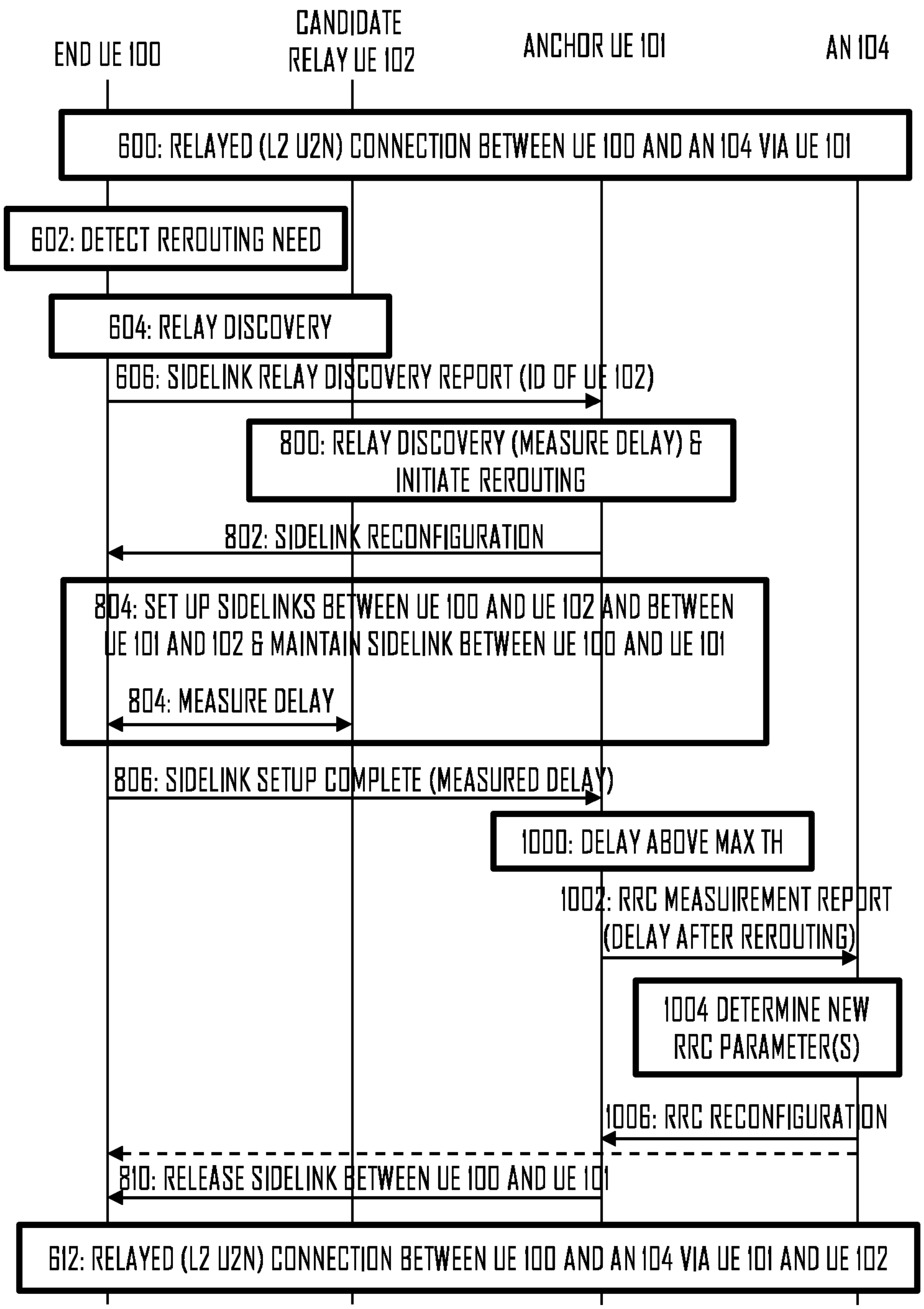
FIG. 10 illustrates an embodiment for performing rerouting assisted by an access node according to an embodiment.

FIG. 10 illustrates a modification of the embodiment of FIG. 8, wherein the modification relates to a situation where the comparison of the (summed) delay with the maximum delay threshold indicates that the delay is above the threshold (block 1000). In such a case, the anchor terminal device may determine that it is incapable of the autonomous rerouting and, as a consequence, it may transmit a radio resource control (RRC) message to the access node to request for the reconfiguration in step 1002. The RRC message may be an RRC measurement report indicating, for example, the measured delay. The delay may be measured on the basis of the measurement data of the involved radio links between the end terminal device and the at least one candidate terminal device and between the anchor terminal device and the at least one candidate terminal device. The delay may be measured based on a request-response signaling and measuring a delay between the request and associated response to determine the communication delay of the particular radio link, as described herein. In another embodiment, the delay may be measured by a device that is not part of the signaling. For example, the anchor terminal device may be capable of detecting and extracting messages transferred between the end terminal device and the candidate terminal devices and may observe the request-response signaling between the end terminal device and the at least one candidate terminal device. Then, the anchor terminal device may measure the delay between the end terminal device and the candidate terminal device on the basis of the observations.

Upon receiving the RRC message in step 1002, the access node may determine a reconfiguration for at least one of the end terminal device and the anchor terminal device. With respect to the end terminal device, the access node may alleviate QoS requirements of the L2 connection, e.g. increase a delay budget for the connection. The delay budget may be understood a maximum delay or latency allowed for communication between the access node and the end terminal device via the anchor terminal device. The maximum delay threshold is a part of the delay budget in the sense that it defines a maximum delay or latency allowed between the anchor terminal device and the end terminal device. And as described above, the connection between the anchor terminal device and the end terminal device may be routed autonomously by the anchor terminal device in various ways as long as the latency stays within the maximum delay threshold. Mathematically, the delta budget may define the following rule the anchor terminal device aims to follow: delay (end UE, anchor UE)+delay (anchor UE, access node)≤delay budget, and the maximum delay threshold defines the maximum limits to delay (end UE, anchor UE).

With respect to the anchor terminal device, the access node may adjust resource allocation over sidelink(s) and the radio link between the anchor terminal device and the access node to allocate more resources for boosting data rate and therefore reducing the end-to-end delay of the connection and/or increasing scheduling priority of a target radio bearer (RB) of one or more of the radio links of the anchor terminal device. The RRC reconfiguration may be performed in block 1004. The access node may then issue a RRC message to at least the anchor terminal device and, optionally, the end terminal device (step 1006). Thereafter, the anchor terminal device may compute the delay between the end terminal device and the anchor terminal device via the candidate terminal device 102 again and perform the comparison. Since the delay has been reported to the access node in step 1002, the anchor node may rely on the capability of the access node to find the reconfiguration that meets the maximum delay threshold limitation and omit the new comparison. Then, the anchor terminal device may release the sidelink (step 810) and enable the rerouted connection via the terminal device 102, and send a RRC reconfiguration complete message to the access node to complete the reconfiguration. Steps 1000 to 1006 are directly applicable to the embodiment of FIG. 6 as well.

In an alternative embodiment, the access node may update the maximum delay threshold in block 1004 to a new maximum delay threshold that is greater than the maximum delay threshold used in the comparison and greater than said at least one communication delay. Upon receiving the new maximum delay threshold, the anchor terminal device may perform new comparison and, then, perform said rerouting.

In an alternative embodiment, the end terminal device that operates the L2 connection with the access node may perform blocks 302 to 308 of FIG. 3 instead of the anchor terminal device. Accordingly, upon detecting the need for the rerouting, the end terminal device may trigger block 302. In the embodiments of FIGS. 6 to 10, the end terminal device may perform block 608 and determine whether or not the autonomous rerouting is possible and report the rerouting to the access node via L2 signalling. In such a case, the end terminal device may request the anchor terminal device and/or the candidate terminal device(s) to carry out the additional relay discovery procedure to compute the delay over the sidelink(s) between the anchor terminal device and the candidate terminal device(s). The end terminal device may then receive the sidelink relay discovery report(s) described above in connection with step 606. Similarly, the end terminal device may send the sidelink reconfiguration message of step 802 to the anchor terminal device.

In some cases, the anchor terminal device may determine that the rerouting via the one or more candidate terminal devices is not possible. The anchor terminal device may indicate this to its end terminal device either directly or via the candidate terminal device, optionally with a cause for the rejection of the rerouting, e.g. too high delay or too poor channel quality. This may be realized using, for example, a SL U2U (UE-to-UE) Reject message. The end terminal device may then decide whether to use the existing relayed connection via the anchor terminal device as long as possible or to try other alternatives, for example to try direct connection to the access node 104 or search for a new anchor terminal device via the relay discovery and reselection procedure.

In an embodiment, instead of the additional relay discovery procedure, the rerouting request received in step 606 may trigger the anchor terminal device to initiate establishment of a sidelink with the one or more candidate terminal devices and measure the delay in connection with the establishment. After the delay measurements and the comparison with the maximum delay threshold, one of the sidelinks may be maintained and the possible other sidelinks released. The one maintained may meet the delay requirement. This embodiment may be applied only when the end terminal device proposes only one candidate terminal device for the rerouting. In such a case, the end terminal device may also initiate the establishment of the sidelink with the candidate terminal device 102.

In one embodiment where the rerouting via the candidate terminal device 102 is possible, either autonomously or with the help from the access node, the candidate terminal device may be considered also as a new anchor terminal device to provide the L2 U2N (UE-to-Network) relaying. The candidate terminal device may be currently in a state where it cannot provide the L2 U2N relaying, e.g. in an RRC idle state. However, the anchor terminal device (or the end terminal device in the respective embodiment) may report this observation of the availability of the candidate terminal device 102 as the new anchor node in step 1002. This information may cause the access node to reconfigure the candidate terminal device 102 or to initiate a reconfiguration of the candidate terminal device 102 by another access node in case the candidate terminal device 102 is not served by the access node 104. The reconfiguration may reconfigure the RRC state of the candidate terminal device to the RRC connected state where the candidate terminal device is capable of providing the L2 U2N relaying and, as a consequence, the candidate terminal device 102 may replace the anchor terminal device as the new anchor terminal device. In this manner, the two-hop relaying via the terminal devices 101, 102 may be operated until the terminal device 102 is capable of providing the L2 U2N connection and, thereafter, the anchor terminal device 101 may be dropped to realize the relaying via only the new anchor terminal device 102.

In an embodiment, the terminal devices 100 to 102 may belong to the same group of terminal devices and have a common group identifier. In such a case, the rerouting may be confined to the group and the candidate terminal devices selected as the candidates for the rerouting may be confine to terminal devices of the group. For example, upon discovering in the relay discovery procedure a terminal device that supports the required relaying but that is not a member of the group, the terminal device may be excluded from the consideration as the candidate terminal device for the rerouting.

In an embodiment, the anchor terminal device may be configured to flexibly modify the maximum delay threshold or corresponding channel quality thresholds based on the required QoS or discovery results. For example, if there are not enough potential candidate terminal devices, the threshold(s) may be lowered. On the other hand, if there are too many candidate terminal devices meeting the criteria, the threshold(s) may be raised by the anchor terminal device.

In an embodiment, the sidelink between the end terminal device and the anchor terminal device is maintained after the rerouting as a parallel path. The parallel paths may be used to deliver duplicates of data and/or signalling messages for additional reliability. It also enables switching back to the single-hop relaying, if the need for rerouting and using multi-hop relaying diminishes.

Figure 11:
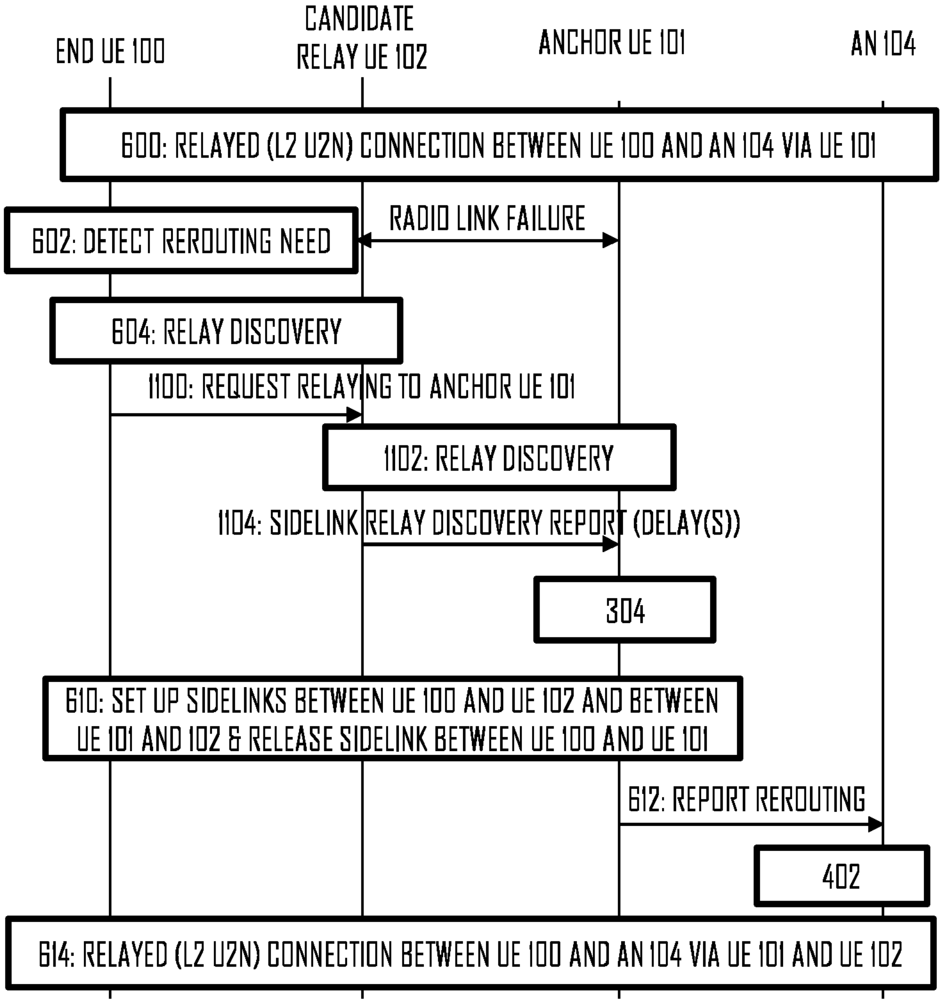
FIG. 11 illustrates an embodiment for performing rerouting in case of a radio link failure according to an embodiment.

In some cases the quality of the sidelink between the end terminal device and the anchor terminal device experiences an abrupt radio link failure. In such a case, the communication between the terminal devices may be unsuccessful, and the procedures described above may fail in the rerouting attempt. FIG. 11 illustrates an embodiment for performing the rerouting in such a case. Referring to FIG. 11, the end terminal device may detect the radio link failure in block 602 and, as a consequence, determine the need for rerouting the relayed connection with the access node. The relay discovery may be carried out in block 604 according to the unidirectional or bidirectional procedure. Let us assume that the candidate terminal device 102 is discovered as the candidate for the rerouting. In step 1100, the end relay terminal device 100 transmits to the candidate terminal device a message requesting the candidate terminal device 102 to establish a sidelink with the end terminal device for the purpose of relaying, wherein the message further comprises an identifier of the anchor terminal device. The identifier indicates to the candidate terminal device the other party of the relaying and, on the basis of the identifier, the candidate terminal device is capable of performing the additional relay discovery procedure only with the anchor terminal device 101 in block 1102. In connection with steps 604, 1100 and 1102, the terminal devices may measure the delays of the two radio links, and the candidate terminal device may report to the anchor terminal device at least the measured delay between the terminal devices 100, 102. Further, the channel quality between the terminal devices 100, 102 and 101, 102 may be measured in the above-described manner and delivered to the anchor terminal device for the purpose of determining whether or not the rerouting via the candidate terminal device meets with at least the maximum delay threshold criterion (optionally also channel quality criterion). Upon determining that the rerouting meets the criterion/criteria, block 610 may be carried out and the relayed connection may be made a multi-hop relayed connection via the terminal device 102. The difference to the above-described embodiments in block 610 is that the configuration of the rerouting needs to be relayed from the anchor terminal device to the end terminal device via the candidate terminal device and that the sidelink between the terminal devices 100, 101 may have already been terminated due to the radio link failure. While this embodiment is described as a modification to the embodiment of FIG. 6, it is directly applicable to the embodiment of FIG. 8 and to the embodiment of FIG. 10 where the anchor terminal device needs the support from the access node 104. Step 810 may be omitted, and the RRC reconfiguration from the access node to the end terminal device in step 1006 may need to be delivered via the candidate terminal device 102.

This embodiment modifies the processes of FIGS. 3 and 5 such that the anchor terminal device receives the message requesting for the rerouting from the candidate terminal device 102 instead of the end terminal device. Similarly, the message configuring the rerouting to the end terminal device is delivered to the end terminal device by the candidate terminal device 102 and not directly by the anchor terminal device.

Figure 12:
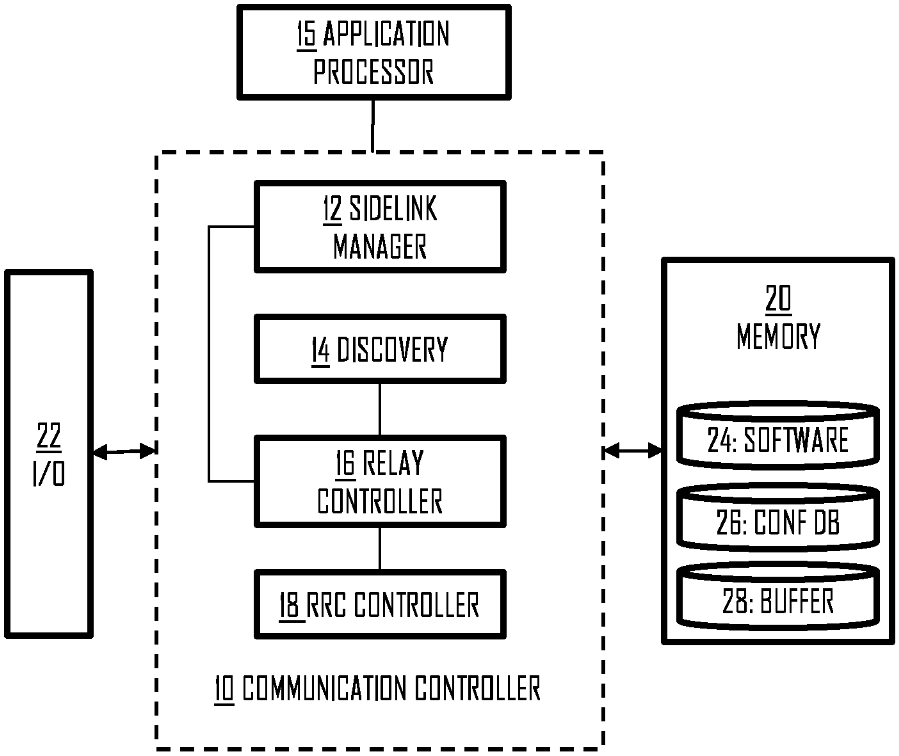
FIGS. 12 to 14 illustrate block diagrams of embodiments of apparatuses configured to carry out the respective processes of FIGS. 3 to 5.

FIG. 12 illustrates an apparatus comprising a processing circuitry, such as at least one processor, and at least one memory 20 including a computer program code (software) 24, wherein the at least one memory and the computer program code (software) are configured, with the at least one processor, to cause the apparatus to carry out the process of FIG. 3 or any one of its embodiments described above. The apparatus may be for the anchor terminal device. The apparatus may be a circuitry or an electronic device realizing some embodiments of the invention in the anchor terminal device. The apparatus carrying out the above-described functionalities may thus be comprised in such a device, e.g. the apparatus may comprise a circuitry such as a chip, a chipset, a processor, a micro controller, or a combination of such circuitries for the anchor terminal device. The at least one processor or a processing circuitry may realize a communication controller 10 controlling communications with the cellular network infrastructure and over the sidelinks for the purpose of relaying in the above-described manner. The communication controller may be configured to establish and manage radio connections and transfer of data over the radio connections.

The communication controller may comprise a RRC controller 18 configured to manage RRC connections with the access node 104 and other access nodes of the cellular communication system. The RRC controller 18 may support relaying for other terminal devices such as the end terminal device. In such a case, the RRC controller may control a relay controller 16 to manage the relaying and the mapping of the two logical connections (of the anchor terminal device and of the end terminal device) to the same physical layer of the RRC connection with the access node 104. The relay controller 16 may be configured to manage the rerouting according to any one of the embodiments described above and perform, for example, blocks 300 to 308 of FIG. 3. For the purpose of acquiring the information on the delay(s), the relay controller may employ a discovery circuit 14 configured to perform the relay discovery procedure and measure the delay and optionally the channel quality during the relay discovery. The relay controller 12 may further control a sidelink manager that manages the sidelinks established by the anchor terminal device, e.g. with the end terminal device before the rerouting and with the terminal device 102 after the rerouting according to the principles described above.

The memory 20 may be implemented using any suitable data storage technology, such as semiconductor-based memory devices, flash memory, magnetic memory devices and systems, optical memory devices and systems, fixed memory and removable memory. The memory 20 may comprise a configuration database 26 for storing configuration parameters, e.g. the maximum delay threshold. The memory 20 may further store a data buffer 28 for relay data to be transmitted from the apparatus towards the access node and/or towards the end device.

The apparatus may further comprise a communication interface 22 comprising hardware and/or software for providing the apparatus with radio communication capability with one or more access nodes, as described above. The communication interface 22 may include, for example, an antenna, one or more radio frequency filters, a power amplifier, and one or more frequency converters. The communication interface 22 may comprise hardware and software needed for realizing the radio communications over the radio interface, e.g. according to specifications of an LTE or 5G radio interface.

Figure 13:
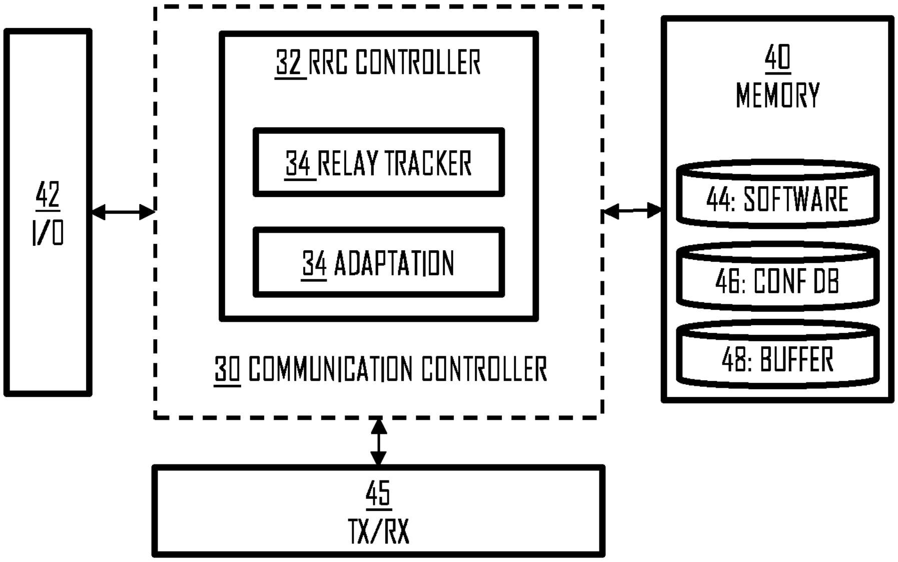

FIG. 13 illustrates an apparatus comprising a processing circuitry, such as at least one processor, and at least one memory 40 including a computer program code (software) 44, wherein the at least one memory and the computer program code (software) are configured, with the at least one processor, to cause the apparatus to carry out functions of the access node 104 in the process of FIG. 4 or any one of its embodiments described above. The apparatus may be for the access node. The apparatus may be a circuitry or an electronic device realizing some embodiments of the invention in the access node. The apparatus carrying out the above-described functionalities may thus be comprised in such a device, e.g. the apparatus may comprise a circuitry such as a chip, a chipset, a processor, a micro controller, or a combination of such circuitries for the access node. In other embodiments, the apparatus is the access node. The at least one processor or a processing circuitry may realize a communication controller 30 controlling communications with the cellular network infrastructure in the above-described manner. The communication controller may be configured to establish and manage radio connections and transfer of data over the radio connections.

The communication controller 30 may comprise an RRC controller 32 configured to establish, manage, and terminate radio connections with terminal devices served by the access node. The RRC controller 52 may be configured, for example, to establish and reconfigure the RRC connections with the terminal devices 100, 101. The RRC controller may have a MAC connection (Layer 2) with both the end terminal device and the anchor terminal device during the embodiments described above.

The communication controller may comprise a relay tracker circuit 34 configured to track the relay route to the end terminal device. The RRC controller may use this information for the purpose of determining a need for rerouting. In such a case, the access node may trigger and instruct the rerouting which is beyond the description of this document. In the context of the embodiments of this document, the relay tracker may carry out blocks 400 and 402 of FIG. 4. The RRC controller may further comprise an adaptation circuit 34 configured to carry out blocks 410 and 412 of FIG. 4 according to any one of the embodiments described above. In other words, the adaptation circuit helps the anchor terminal device in the situation where the anchor terminal device cannot perform the autonomous rerouting.

The memory 40 may be implemented using any suitable data storage technology, such as semiconductor-based memory devices, flash memory, magnetic memory devices and systems, optical memory devices and systems, fixed memory and removable memory. The memory 40 may comprise a configuration database 46 for storing configuration parameters, e.g. the current parameters of the RRC connections.

The apparatus may further comprise a radio frequency communication interface 45 comprising hardware and/or software for providing the apparatus with radio communication capability with the terminal devices, as described above. The communication interface 45 may include, for example, an antenna array, one or more radio frequency filters, a power amplifier, and one or more frequency converters. The communication interface 42 may comprise hardware and software needed for realizing the radio communications over the radio interface, e.g. according to specifications of an LTE or 5G radio interface.

The apparatus may further comprise another communication interface 42 for communicating towards the core network and other access nodes. The communication interface may support respective communication protocols of the cellular communication system to enable communication with other access nodes, with other nodes of the radio access network, and with nodes in the core network and even beyond the core network. The communication interface 42 may comprise necessary hardware and software for such communications.

Figure 14:
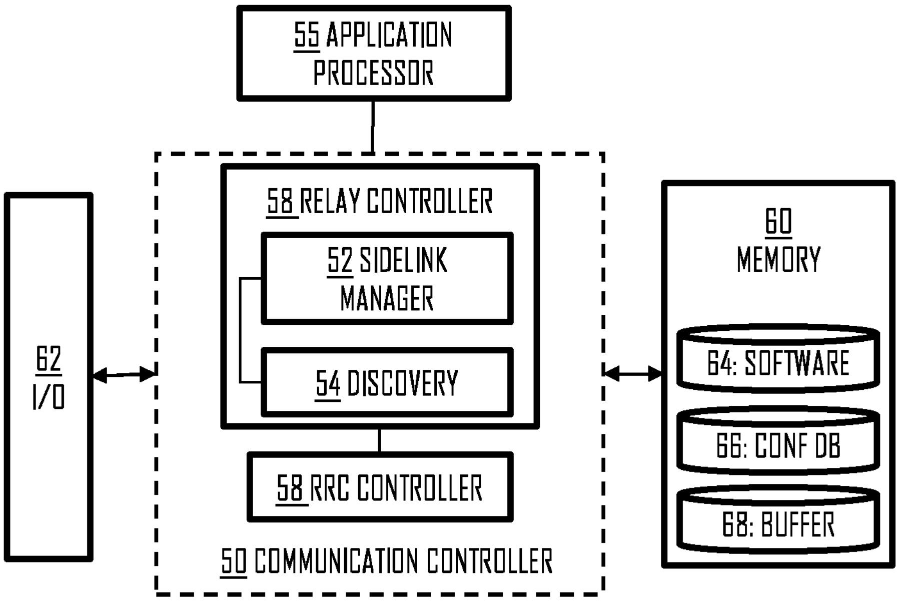

FIG. 14 illustrates an apparatus comprising a processing circuitry, such as at least one processor, and at least one memory 60 including a computer program code (software) 64, wherein the at least one memory and the computer program code (software) are configured, with the at least one processor, to cause the apparatus to carry out the process of FIG. 5 or any one of its embodiments described above. The apparatus may be for the end terminal device. The apparatus may be a circuitry or an electronic device realizing some embodiments of the invention in the end terminal device. The apparatus carrying out the above-described functionalities may thus be comprised in such a device, e.g. the apparatus may comprise a circuitry such as a chip, a chipset, a processor, a micro controller, or a combination of such circuitries for the end terminal device. The at least one processor or a processing circuitry may realize a communication controller 50 controlling communications with the cellular network infrastructure and over the sidelinks for the purpose of relaying in the above-described manner. The communication controller may be configured to establish and manage radio connections and transfer of data over the radio connections.

The communication controller may comprise a RRC controller 58 configured to manage RRC connections with the access node 104 and other access nodes of the cellular communication system. The RRC controller 18 may support relaying through other terminal devices such as the terminal device 100, 102, including multi-hop relaying. The communication controller 50 may further comprise a sidelink manager 52 configured to operate the sidelinks of the end terminal device, e.g. the sidelink to the terminal devices 100, 102 in the embodiments described above. The sidelink manager may also detect the need for the rerouting in block 502. Upon detecting the need for the rerouting, the sidelink manager may trigger a relay discovery circuit 54 to perform the relay discovery of block 504. On the basis of the relay discovery, the relay controller may then proceed with the rerouting in the end terminal device according to the embodiments described above.

The memory 60 may be implemented using any suitable data storage technology, such as semiconductor-based memory devices, flash memory, magnetic memory devices and systems, optical memory devices and systems, fixed memory and removable memory. The memory 60 may comprise a configuration database 66 for storing configuration parameters, e.g. the maximum delay threshold when the end terminal device makes the decision about the rerouting. The memory 60 may further store a data buffer 68 for relay data to be transmitted from the apparatus towards the access via one or more relay terminal devices 101, 102.

The apparatus may further comprise a communication interface 62 comprising hardware and/or software for providing the apparatus with radio communication capability with one or more access nodes, as described above. The communication interface 62 may include, for example, an antenna, one or more radio frequency filters, a power amplifier, and one or more frequency converters. The communication interface 62 may comprise hardware and software needed for realizing the radio communications over the radio interface, e.g. according to specifications of an LTE or 5G radio interface.

The apparatuses of FIGS. 12 and 14 may further comprise an application processor 15, 55 operating as a source and a sink for application data transferred over the RRC connection and via the relaying. The application data may relate to a primary purpose of an apparatus comprising the terminal device. Such an apparatus may be a mobile phone, a tablet computer, a smart watch, or another personal communication device, or it may be a sensor device or another industrial device with cellular communication capability. Accordingly, the application data may comprise various data.

As used in this application, the term 'circuitry' refers to one or more of the following: (a) hardware-only circuit implementations such as implementations in only analog and/or digital circuitry; (b) combinations of circuits and software and/or firmware, such as (as applicable): (i) a combination of processor(s) or processor cores; or (ii) portions of processor(s)/software including digital signal processor(s), software, and at least one memory that work together to cause an apparatus to perform specific functions; and (c) circuits, such as a microprocessor(s) or a portion of a microprocessor(s), that require software or firmware for operation, even if the software or firmware is not physically present.

This definition of 'circuitry' applies to uses of this term in this application. As a further example, as used in this application, the term "circuitry" would also cover an implementation of merely a processor (or multiple processors) or portion of a processor, e.g. one core of a multi-core processor, and its (or their) accompanying software and/or firmware. The term "circuitry" would also cover, for example and if applicable to the particular element, a baseband integrated circuit, an application-specific integrated circuit (ASIC), and/or a field-programmable grid array (FPGA) circuit for the apparatus according to an embodiment of the invention.

The processes or methods described in FIG. 3, 4, 5, or any of the embodiments thereof may also be carried out in the form of one or more computer processes defined by one or more computer programs. The computer program(s) may be in source code form, object code form, or in some intermediate form, and it may be stored in some sort of carrier, which may be any entity or device capable of carrying the program. Such carriers include transitory and/or non-transitory computer media, e.g. a record medium, computer memory, read-only memory, electrical carrier signal, telecommunications signal, and software distribution package. Depending on the processing power needed, the computer program may be executed in a single electronic digital processing unit or it may be distributed amongst a number of processing units.

Embodiments described herein are applicable to wireless networks defined above but also to other wireless networks. The protocols used, the specifications of the wireless networks and their network elements develop rapidly. Such development may require extra changes to the described embodiments. Therefore, all words and expressions should be interpreted broadly and they are intended to illustrate, not to restrict, the embodiment. It will be obvious to a person skilled in the art that, as technology advances, the inventive concept can be implemented in various ways. Embodiments are not limited to the examples described above but may vary within the scope of the claims.

The invention claimed is:

1. An apparatus supporting relaying between an access node and an end terminal device, comprising:

at least one memory comprising computer program code;

at least one processor;

wherein the at least one memory and the computer program code are configured, with the at least one processor, to cause the apparatus at least to:

receive a message requesting rerouting of said relaying, the message comprising at least one information element indicating at least one candidate terminal device;

determine a communication delay between the apparatus and the end terminal device via at least one of said at least one candidate terminal device and compare the determined communication delay with a maximum delay threshold;

reroute the relaying between the apparatus and the end terminal device, if at least one determined communication delay is smaller than the maximum delay threshold, via one of the at least one candidate terminal device that provides the communication delay smaller than the maximum delay threshold, wherein the rerouting is carried out autonomously without receiving from the access node a reconfiguration message instructing the rerouting configuration; and transmit a message to the access node, if no communication delay is smaller than the maximum delay threshold, wherein the message indicating a need for reconfiguration of the relaying.

2. The apparatus of claim 1, wherein the at least one memory and the computer program code are configured, with the at least one processor, cause the apparatus at least to:

receive, from the access node in response to the message indicating the need for the reconfiguration of the relaying, a new maximum delay threshold that is greater than the maximum delay threshold used in the comparison and greater than said at least one communication delay, and to perform said rerouting upon receiving the new maximum delay threshold.

3. The apparatus of claim 2, wherein the at least one memory and the computer program code are configured, with the at least one processor, cause the apparatus at least to:

add one of the at least one determined communication delay to the message indicating the need for reconfiguration of the relaying.

4. The apparatus of claim 1, wherein the at least one memory and the computer program code are configured, with the at least one processor, cause the apparatus at least to:

perform said rerouting by configuring a first radio link between the apparatus and said one of the at least one candidate terminal device and a second radio link between the end terminal device and said one of the at least one candidate terminal device.

5. The apparatus of claim 1, wherein the at least one memory and the computer program code are configured, with the at least one processor, cause the apparatus at least to:

receive the at least one information element from the end terminal device, wherein the at least one information element indicating the at least one candidate terminal device comprises measurement data of at least one radio link between the end terminal device and the at least one candidate terminal device and/or measurement data of at least one radio link between the apparatus and the at least one candidate terminal device; and select said one of the at least one candidate terminal device on the basis of the measurement data.

6. The apparatus of claim 5, wherein the measurement data comprises at least one of the following parameters:

at least one of the following communication delays: at least one communication delay between the end terminal device and the at least one candidate terminal device, at least one communication delay between the end terminal device and the apparatus via the at least one candidate terminal device, or at least one communication delay between the apparatus and the at least one candidate terminal device;

at least one of the following channel quality metrics: at least one channel quality metric of a radio channel between the end terminal device and the at least one candidate terminal device, or at least one channel quality metric of a radio channel between the apparatus and the at least one candidate terminal device.

7. The apparatus of claim 5, wherein the at least one memory and the computer program code are configured, with the at least one processor, cause the apparatus at least to:

determine, on the basis of the measurement data, whether or not to measure a radio link between the apparatus and the at least one candidate terminal device;

measure, upon determining to measure the radio link between the apparatus and the at least one candidate terminal device, at least one of a communication delay and channel quality metric of the radio link between the apparatus and the at least one candidate terminal device; and select said one of the at least one candidate terminal device on the basis of the measurement data and the measured at least one of the communication delay and channel quality metric of the radio link between the apparatus and the at least one candidate terminal device.

8. A method for an anchor terminal device supporting relaying between an access node and an end terminal device, comprising, by the anchor terminal device:

receiving a message requesting rerouting of said relaying, the message comprising at least one information element indicating at least one candidate terminal device;

determining a communication delay between the anchor terminal device and the end terminal device via at least one of said at least one candidate terminal device and comparing the determined communication delay with a maximum delay threshold;

rerouting the relaying between the anchor terminal device and the end terminal device, if at least one determined communication delay is smaller than the maximum delay threshold, via one of the at least one candidate terminal device that provides the communication delay smaller than the maximum delay threshold, wherein the rerouting is carried out autonomously without receiving from the access node a reconfiguration message instructing the rerouting configuration; and transmitting a message to the access node, if no communication delay is smaller than the maximum delay threshold, wherein the message indicating a need for reconfiguration of the relaying.

9. The method of claim 8, further comprising:

receiving, from the access node in response to the message indicating the need for the reconfiguration of the relaying, a new maximum delay threshold that is greater than the maximum delay threshold used in the comparison and greater than said at least one communication delay; and performing said rerouting upon receiving the new maximum delay threshold.

10. The method of claim 9, further comprising:

adding one of the at least one determined communication delay to the message indicating the need for reconfiguration of the relaying.

11. The method of claim 8, further comprising:

performing said rerouting by configuring a first radio link between the anchor terminal device and said one of the at least one candidate terminal device and a second radio link between the end terminal device and said one of the at least one candidate terminal device.

12. The method of claim 8, further comprising:

receiving the at least one information element from the end terminal device, wherein the at least one information element indicating the at least one candidate terminal device comprises measurement data of at least one radio link between the end terminal device and the at least one candidate terminal device and/or measurement data of at least one radio link between the anchor terminal device and the at least one candidate terminal device; and selecting said one of the at least one candidate terminal device on the basis of the measurement data.

13. The method of claim 12, wherein the measurement data comprises at least one of the following parameters:

at least one of the following communication delays: at least one communication delay between the end terminal device and the at least one candidate terminal device, at least one communication delay between the end terminal device and the anchor terminal device via the at least one candidate terminal device, or at least one communication delay between the anchor terminal device and the at least one candidate terminal device;

at least one of the following channel quality metrics: at least one channel quality metric of a radio channel between the end terminal device and the at least one candidate terminal device, or at least one channel quality metric of a radio channel between the anchor terminal device and the at least one candidate terminal device.

14. The method of claim 13, wherein the anchor terminal device further performs the following:

determining, on the basis of the measurement data, whether or not to measure a radio link between the anchor terminal device and the at least one candidate terminal device;

measuring, upon determining to measure the radio link between the anchor terminal device and the at least one candidate terminal device, at least one of a communication delay and channel quality metric of the radio link between the anchor terminal device and the at least one candidate terminal device; and selecting said one of the at least one candidate terminal device on the basis of the measurement data and the measured at least one of the communication delay and channel quality metric of the radio link between the anchor terminal device and the at least one candidate terminal device.

* * * * *